United States Patent
Lehtinen et al.

(10) Patent No.: US 7,666,318 B1
(45) Date of Patent: Feb. 23, 2010

(54) PROCESS, METHOD AND SYSTEM FOR REMOVING MERCURY FROM FLUIDS

(75) Inventors: Larry J. Lehtinen, Two Harbors, MN (US); Jeffrey A. Hansen, Fort Wayne, IN (US)

(73) Assignee: Ferro, LLC, Gilbert, MN (US)

(*) Notice: Subject to any disclaimer, the term of this patent is extended or adjusted under 35 U.S.C. 154(b) by 504 days.

(21) Appl. No.: 11/433,393

(22) Filed: May 12, 2006

Related U.S. Application Data

(60) Provisional application No. 60/680,941, filed on May 12, 2005.

(51) Int. Cl.
*B01D 53/02* (2006.01)
(52) U.S. Cl. .................... 210/914; 95/107; 95/134; 210/660; 210/688
(58) Field of Classification Search ............... 95/134, 95/107; 210/660, 688, 914
See application file for complete search history.

(56) References Cited

U.S. PATENT DOCUMENTS

| | | | | |
|---|---|---|---|---|
| 3,859,174 A | * | 1/1975 | Taylor | 203/10 |
| 3,933,648 A | * | 1/1976 | Urayama | 210/355 |
| 4,108,769 A | * | 8/1978 | Krieg et al. | 210/720 |
| 4,201,665 A | * | 5/1980 | Savage et al. | 210/673 |
| 4,377,483 A | * | 3/1983 | Yamashita et al. | 210/670 |
| 4,786,483 A | * | 11/1988 | Audeh | 423/210 |
| 4,814,152 A | * | 3/1989 | Yan | 423/210 |
| 4,911,825 A | * | 3/1990 | Roussel et al. | 208/251 R |
| 4,938,939 A | * | 7/1990 | Kuznicki | 423/326 |
| 4,946,582 A | * | 8/1990 | Torihata et al. | 208/251 R |
| 5,062,948 A | * | 11/1991 | Kawazoe et al. | 208/251 R |
| 5,236,595 A | * | 8/1993 | Wang et al. | 210/669 |
| 5,401,392 A | * | 3/1995 | Courty et al. | 208/251 H |
| 5,419,884 A | * | 5/1995 | Weekman et al. | 423/210 |
| 5,523,067 A | * | 6/1996 | Markovs | 423/99 |
| 5,803,663 A | * | 9/1998 | Matsuyama et al. | 405/128.8 |
| 6,197,199 B1 | * | 3/2001 | McArdle | 210/684 |
| 6,221,128 B1 | * | 4/2001 | Giri | 75/742 |
| 6,612,249 B2 | * | 9/2003 | Sanders | 110/345 |
| 6,719,828 B1 | * | 4/2004 | Lovell et al. | 95/134 |
| 6,896,815 B2 | * | 5/2005 | Cort | 210/695 |
| 2003/0082084 A1 | * | 5/2003 | Cort | 423/25 |
| 2003/0082085 A1 | * | 5/2003 | Harada et al. | 423/210 |
| 2006/0151395 A1 | * | 7/2006 | Gavaskar et al. | 210/660 |

OTHER PUBLICATIONS

Zanko, et al, Mineralogical and microscopic evaluation of coarse taconite tailings from Minnesota taconite operations, Oct. 2007, Regulatory Toxicology and Pharmacology 52, S51-S65.*

* cited by examiner

*Primary Examiner*—Robert J Hill, Jr.
*Assistant Examiner*—Christopher P Jones
(74) *Attorney, Agent, or Firm*—Krieg DeVault LLP

(57) ABSTRACT

There are provided methods and processes that employ a mercury-adsorbing granular material as a sorbent to remove mercury from fluids. The fluids can be waste fluids that result from manufacturing, processing, or other treatment processes or systems. The fluids can also be fluids that are treated in their natural state. The fluids to be treated may include water, air, sludge, slurries, gases from processing or furnaces flues, gaseous flows, liquid flows, and other gases and liquids. In one excellent form of the invention, the mercury-adsorbing material includes taconite tailings.

39 Claims, 21 Drawing Sheets

Calculated Waste Water Chemistry and Achievable Model Water Chemistry

| | Constituent | Calculated Waste Water Concentrations | | Laboratory Achievable Model Water | | Ultra Stocks | |
|---|---|---|---|---|---|---|---|
| | | conc. | units | conc. | units | conc. | units |
| General Parameters | Solids, Total Dissolved | 4393.04 | mg/L | to be det. | mg/L | | |
| | Hardness | 1408.85 | mg/L | to be det. | mg/L | | |
| | Alkalinity, Total | 645.43 | mg/L | to be det. | mg/L | | |
| Organic | COD | 340.87 | mg/L | 348 | mg/L | 3578 | mg/L |
| | TOC | 83.98 | mg/L | 141 | mg/L | 1414 | mg/L |
| | BOD | 59.51 | mg/L | 350 | mg/L | 3500 | mg/L |
| | DRO | 10.60 | mg/L | 10 | mg/L | 2500 | mg/L |
| | GRO | 1.63 | mg/L | 2 | mg/L | 2500 | mg/L |
| | Surfactants | 0.41 | mg/L | 0.5 | mg/L | | mg/L |
| Nutrients | Nitrogen, Tot. Organic | 35.38 | mg/L | to be det. | mg/L | | |
| | Nitrogen, Tot. Kjeldahl | 28.93 | mg/L | to be det. | mg/L | | |
| | Nitrogen, Nitrate+Nitrite | 16.72 | mg/L | 720 ** | mg/L | 1672 | mg/L |
| | Nitrogen, Ammonia | 6.21 | mg/L | 9 | mg/L | 621 | mg/L |
| | Phosphorous | 0.5 | mg/L | 0.5 | mg/L | 1000 | mg/L |
| Anionic | Sulfate | 2000.00 | mg/L | 2210 | mg/L | 20,000 | mg/L |
| | Chloride | 591.82 | mg/L | 2510 | mg/L | (none) | mg/L |
| | Sulfide | 8.44 | mg/L | 8.44 | mg/L | 84.4 | mg/L |
| | Fluoride | 30.00 | mg/L | 39.0 | mg/L | 300 | mg/L |
| | Bromide | 7.75 | mg/L | 7.75 | mg/L | 77.5 | mg/L |
| Cationic | Sodium | 1336.000 | mg/L | 1280 | mg/L | (none) | mg/L |
| | Calcium | 1579.980 | mg/L | 1580 | mg/L | 15800 | mg/L |
| | Potassium | 232.220 | mg/L | 327 | mg/L | 3230 | mg/L |
| | Magnesium | 439.470 | mg/L | 439 | mg/L | 4390 | mg/L |
| | Iron | 1.500 | mg/L | 1.5 | mg/L | 15 | mg/L |
| | Manganese | 0.750 | mg/L | 0.75 | mg/L | 7.5 | mg/L |

*Fig. 1a*

Calculated Waste Water Chemistry and Achievable Model Water Chemistry

| | Constituent | Calculated Waste Water Concentrations | | Laboratory Achievable Model Water | | Ultra Stocks | |
|---|---|---|---|---|---|---|---|
| | | conc. | units | conc. | units | conc. | units |
| Cationic | Titanium | 3784.73000 | ug/L | 3780 | ug/L | 3784 | mg/L |
| | Boron | 3129.13000 | ug/L | 3130 | ug/L | 3130 | mg/L |
| | Lithium | 2269.45000 | ug/L | 2270 | ug/L | 3130 | mg/L |
| | Molybdenum | 1511.12000 | ug/L | 1510 | ug/L | 1510 | mg/L |
| | Zinc | 300.00000 | ug/L | 300 | ug/L | 300 | mg/L |
| | Tin | 164.12000 | ug/L | 160 | ug/L | 160 | mg/L |
| | Aluminum | 150.00000 | ug/L | 150 | ug/L | 150 | mg/L |
| | Strontium | 150.00000 | ug/L | 150 | ug/L | 150 | mg/L |
| | Barium | 150.00000 | ug/L | 150 | ug/L | 150 | mg/L |
| | Lead | 150.00000 | ug/L | 150 | ug/L | 150 | mg/L |
| | Chromium | 75.00000 | ug/L | 75 | ug/L | 75 | mg/L |
| | Antimony | 49.76000 | ug/L | 50 | ug/L | 50 | mg/L |
| | Nickel | 45.00000 | ug/L | 45 | ug/L | 45 | mg/L |
| | Cobalt | 34.93000 | ug/L | 35 | ug/L | 35 | mg/L |
| | Cadmium | 34.25000 | ug/L | 35 | ug/L | 35 | mg/L |
| | Silver | 15.00000 | ug/L | 15 | ug/L | 15 | mg/L |
| | Thallium | 15.00000 | ug/L | 15 | ug/L | 15 | mg/L |
| | Beryllium | 8.33000 | ug/L | 10 | ug/L | 10 | mg/L |
| | Copper | 7.50000 | ug/L | 10 | ug/L | 10 | mg/L |
| | Vanadium | 7.36000 | ug/L | 10 | ug/L | 10 | mg/L |
| | Arsenic | 4.58000 | ug/L | 5 | ug/L | 5 | mg/L |
| | Selenium | 3.75000 | ug/L | 5 | ug/L | 5 | mg/L |
| Mercury | Mercury | 453.06 | ng/L | | | | |

*Fig. 1b*

Location and General Grain Size Distribution of Tailing Samples

| | GP-1 | GP-2 | GP-3 | GP-4 | GP-5 | GP-6 |
|---|---|---|---|---|---|---|
| Latitude | 47 37.322 | 47 37.325 | 47 37.382 | 47 37.271 | 47 37.330 | 47 36.250 |
| Longitude | 092 07.782 | 092 07.870 | 092 07.821 | 092 07.848 | 092 07.934 | 092 07.034 |
| Depth (ft) | Texture of each four foot core sample | | | | | |
| 0-4 ft | coarse | medium to fine | coarse | medium | fine | coarse |
| 4-8 | coarse | medium to fine | coarse | medium | fine | coarse |
| 8-12 | coarse | medium to fine | coarse | fine | fine | medium |
| 12-16 | coarse | coarse | coarse | coarse | fine | coarse |
| 16-20 | coarse | medium | coarse | coarse | fine | medium |

Coarse    Less than 18% passing the #200 sieve.
Medium    20 to 50% passing the #200 sieve.
Fine    Greater than 50% passing the #200 sieve.

*Fig. 2*

Tailings Types Mineral Composition as a Percent.

| Mineral | Type 1 | Type 2 | Type 3 |
|---|---|---|---|
| Apatite | 0.2 | 0.2 | 0.1 |
| Quartz | 57.6 | 52.8 | 51.3 |
| Pyrite | 0.1 | 0.1 | 0.1 |
| Siderite | 8.7 | 7.8 | 4.7 |
| Ankerite | 6.3 | 7.9 | 4.5 |
| Calcite | 1.0 | 0.1 | 0.3 |
| Annite | 1.2 | 1.1 | 0.8 |
| Biotite | 0.5 | 0.8 | 0.6 |
| Chamosite/Chlorite | 0.7 | 0.8 | 0.4 |
| Greenalite | 0.8 | 0.2 | 0.4 |
| Minnesotaite | 8.2 | 8.1 | 6.8 |
| Talc | 1.7 | 1.7 | 5.7 |
| Stilpnomelane | 1.5 | 1.5 | 4.6 |
| Hornblende | 0.4 | 3.6 | 1.0 |
| Cummingtonite | 1.6 | 3.8 | 5.8 |
| Grunerite | 1.5 | 2.1 | 3.4 |
| Hematite | 0.7 | 1.9 | 7.3 |
| Maghemite | TRACE | TRACE | 2.1 |
| Magnetite | 7.3 | 5.2 | TRACE |
| Akaganeite | TRACE | 0.1 | TRACE |
| Goethite | TRACE | 0.1 | TRACE |
| Lepidocrocite | TRACE | TRACE | TRACE |
| Organic Carbon | 0.1 | 0.1 | TRACE |
| Based on Mineral Assemblages | | | |
| Organic Carbon | 0.1 | 0.1 | TRACE |
| Carbonates | 16.0 | 15.9 | 9.5 |
| Sulfides | 0.1 | 0.1 | 0.1 |
| Quartz | 57.6 | 52.8 | 51.3 |
| Chlorites | 1.5 | 0.9 | 0.8 |
| Talc Minerals | 11.4 | 11.3 | 17.1 |
| Mica/Clay | 2.0 | 1.9 | 1.4 |
| Sheet Silicates | 14.9 | 14.1 | 19.3 |
| Oxides | 8.0 | 7.4 | 9.4 |
| Amphiboles | 3.5 | 9.5 | 10.2 |

*Fig. 3*

Equilibrium Verification and Comparison of Glass and Plastic

Model Water Preparation Data

| | |
|---|---|
| model water batch used for testing: | Batch 4 |
| preparation date: | 1/10/2005 |
| pH of Batch 4 model water: | 4.08 |
| Calculated Hg level in model water: | 440 ng/L |

Experimental Results

| volume (mL) | Type 2 tailings added | Agitation period | Glass | | | | Plastic | | | |
|---|---|---|---|---|---|---|---|---|---|---|
| | | | conc. Hg measured (ng/L) | % left in container after test | % sorbed by tailings using 440 | using 374 | conc. Hg measured (ng/L) | % left in container after test | % sorbed by tailings using 440 | using 399 |
| 200 | none | 2.0 hrs | 374 | 85% | | | 399 | 91% | | |
| 200 | 4.0 grams | 2.0 hrs | 34 | | 92% | 91% | 48 | | 89% | 88% |
| 200 | none | 25 hrs | 415 | 94% | | using 415 | 411 | 93% | | using 399 |
| 200 | 4.0 grams | 25 hrs | 71 | | using 440 84% | 83% | 66 | | using 440 85% | 83% |

*Fig. 4*

Capacity and Effect of Tailings Properties on Mercury Sorption

Model Water Preparation and Analysis Data

| | Model H2O Batch | | | |
|---|---|---|---|---|
| | Batch 5 | Batch 6 | Batch 9 | |
| | 1/13/2005 | 1/18/2005 | 2/16/2005 | Model H2O prep date |
| | 1/18/2005 | 1/26/2005 | 2/16/2005 | Model H2O "equilibrate/precipitate until date" |
| | ~ 5 days | ~ 8 days | 3 1/4 hours | "equil./precip." Total time elapsed |
| | 8.45 | 8.60 | 8.27 | pH check (right before filtration) |
| | | | 10 | ng/L Hg background level (before spiking) |
| | 450 | 450 | 450 | ng/L Spike level added |
| | | | 460 | ng/L True level |
| | 516 | 463 | 556 | ng/L prepared Control level actual (no agitation, no filtration) |
| | | 376 | 496 | ng/L prepared Control level (after 2hr agitation but no 0.45um filtration) |
| | 339 | 153 | 378 | ng/L prepared Control level (after 2hr agitation and 0.45 um filtration) |

*Fig. 5A*

Experimental Results
(After 2 hour agitation and subsequent 0.45 um filtration procedures were applied)

| Type 1 tailings mass added (grams) | Type 3 tailings mass added (grams) | Type 2 tailings mass added (grams) | volume of Model H2O added to tailings (Liters) | conc. left after 2 hr. agitation and filtering (ng/L) | % Hg Sorbed using 450 ng/L 450 ng/L 460 ng/L | % Hg Sorbed using 516 ng/L 463 ng/L 556 ng/L | % Hg Sorbed using 376 ng/L 496 ng/L | % Hg Sorbed using 339 ng/L 153 ng/L 378 ng/L |
|---|---|---|---|---|---|---|---|---|
| | | 4.000 | 0.2 | 41 | 91% | 92% | | 88% |
| | | 1.000 | 0.2 | 49 | 89% | 91% | | 86% |
| | | 1.000 | 0.2 | 44 | 90% | 92% | 91% | 88% |
| | | | | 50 | 89% | 91% | 90% | 87% |
| | | | 0.2 | 60 | 87% | 89% | 88% | 84% |
| | | 0.500 | 0.2 | 75 | 83% | 85% | | 78% |
| | | 0.500 | 0.2 | 20 | 96% | 96% | 95% | 84% |
| | 1.000 | | | | | | | |
| | | 0.250 | 0.2 | 110 | 76% | 76% | 71% | 25% |
| | | 0.100 | 0.2 | 112 | 75% | 78% | | 67% |
| | | 0.100 | 0.2 | 115 | 74% | 78% | | 66% |
| | | 0.050 | 0.2 | 209 | 54% | 59% | | 38% |
| | | 0.050 | 0.2 | 219 | 51% | 58% | | 35% |
| 1.000 | | 0.050 | 0.2 | 80 | 82% | 83% | 79% | 48% |
| | | 0.010 | 0.2 | 103 | 77% | 78% | 73% | 33% |

*Fig. 5B*

Effect of Tailings Treatment on Whole Model Water Chemistry

| | Units | DL | Control #9 | Measurement +GP-3 | +GP-5 | +GP-6 | % Removal +GP-3 | +GP-5 | +GP-6 | Average |
|---|---|---|---|---|---|---|---|---|---|---|
| Alkalinity, Total as CaCO3 | mg/L | 10 | 55 | 65 | 60 | 55 | -18% | -9% | 0% | -9% |
| Aluminum | ug/L | 20 | 20 | 20 | 20 | 20 | 0% | 0% | 0% | 0% |
| Antimony | ug/L | 0.5 | 16.4 | 16.1 | 15.4 | 14.7 | 2% | 6% | 10% | 6% |
| Arsenic | ug/L | 1 | 7.3 | 9.1 | 9.2 | 6.7 | -25% | -26% | 8% | -14% |
| Barium | ug/L | 1.5 | 267 | 265 | 255 | 244 | 1% | 4% | 9% | 5% |
| Beryllium | ug/L | 1 | 1 | 1 | 1 | 1 | 0% | 0% | 0% | 0% |
| Boron | ug/L | 200 | 2690 | 2670 | 2710 | 2770 | 1% | -1% | -3% | -1% |
| Cadmium | ug/L | 0.5 | 4.6 | 4.6 | 4.3 | 4.5 | 0% | 7% | 2% | 3% |
| Calcium | mg/L | 100 | 1590 | 1540 | 1620 | 1350 | 3% | -2% | 15% | 5% |
| Chloride | mg/L | 0.5 | 2750 | 2590 | 2030 | 2630 | 6% | 26% | 4% | 12% |
| Chromium | ug/L | 2.5 | 4.6 | 4.1 | 4.3 | 4.2 | 11% | 7% | 9% | 9% |
| Cobalt | ug/L | 0.5 | 23.2 | 23.1 | 21.9 | 20.1 | 0% | 6% | 13% | 6% |
| Copper | ug/L | 0.5 | 52.1 | 42.9 | 4.6 | 35.7 | 18% | 12% | 31% | 20% |
| Fluoride | mg/L | 0.1 | 34.7 | 34.3 | 32.4 | 31.5 | 1% | 7% | 9% | 6% |
| Hardness (Calculated) | mg/L | 1 | 5270 | 5520 | 5740 | 4990 | -5% | -9% | 5% | -3% |
| Iron | ug/L | 250 | 250 | 250 | 250 | 250 | 0% | 0% | 0% | 0% |
| Lead | ug/L | 0.5 | 0.5 | 0.5 | 0.5 | 0.5 | 0% | 0% | 0% | 0% |
| Lithium | ug/L | 10 | 2020 | 2010 | 1950 | 1960 | 0% | 3% | 3% | 2% |
| Magnesium | mg/L | 2.5 | 317 | 408 | 413 | 396 | -29% | -30% | -25% | -28% |
| Manganese | ug/L | 1 | 471 | 452 | 424 | 234 | 4% | 10% | 50% | 21% |

*Fig. 6A*

Effect of Tailings Treatment on Whole Model Water Chemistry

| | Units | DL | Control #9 | Measurement +GP-3 | +GP-5 | +GP-6 | % Removal +GP-3 | +GP-5 | +GP-6 | Average |
|---|---|---|---|---|---|---|---|---|---|---|
| Molybdenum | ug/L | 10 | 1370 | 1340 | 1290 | 1280 | 2% | 6% | 7% | 5% |
| Nickel | ug/L | 0.5 | 70.6 | 68.7 | 66.5 | 66 | 3% | 6% | 7% | 5% |
| Potassium | mg/L | 10 | 240 | 312 | 315 | 304 | -30% | -31% | -27% | -29% |
| Selenium | ug/L | 2.5 | 19.5 | 20.7 | 19.7 | 20.2 | -6% | -1% | -4% | -4% |
| Silver | ug/L | 20 | 20 | 20 | 20 | 20 | 0% | 0% | 0% | 0% |
| Sodium | mg/L | 250 | 3690 | 3690 | 3710 | 3240 | 0% | -1% | 12% | 4% |
| TDS | mg/L | 10 | 18600 | 17700 | 18400 | 16000 | 5% | 1% | 14% | 7% |
| Strontium | ug/L | 0.5 | 935 | 926 | 894 | 895 | 1% | 4% | 4% | 3% |
| Sulfate | mg/L | 1 | 1940 | 1820 | 1760 | 1970 | 6% | 9% | -2% | 5% |
| Thallium | ug/L | 0.5 | 5.2 | 4.8 | 4.4 | 4.4 | 8% | 15% | 15% | 13% |
| Tin | ug/L | 0.5 | 1.5 | 0.92 | 0.62 | 0.81 | 39% | 59% | 46% | 48% |
| Titanium | ug/L | 10 | 2080 | 2070 | 1950 | 2080 | 0% | 6% | 0% | 2% |
| Vanadium | ug/L | 0.5 | 0.5 | 0.5 | 0.5 | 0.5 | 0% | 0% | 0% | 0% |
| Zinc | ug/L | 25 | 26.2 | 25 | 25 | 25 | 5% | 5% | 5% | 5% |

*Fig. 6B*

Mercury Sorption From Area 1 Pit Water by Successive Tailings Treatments

First experiment (2 successive treatments)

| Test # | Description | Hg Concentration (ng/L) |
|---|---|---|
| 1 | Area 1 Pit water as received, No tailings, no agitation, no filtering | 0.5 |
| 2 | Area 1 Pit water, no tailings, 2.0 hours agitation, 0.45 um filter | 0.9 |
| 3 | Duplicate of #2 | 0.9 |
| 4 | Calculated "spiked" concentration | 12 |
| 5 | Spiked Area 1 Pit water, no tailings, 2 hours agitation, 0.45 um filter | 9.3 |
| 6 | Spiked Area 1 Pit water, 1.0 g type 2 tailings, 2 hours agitation, 0.45 um filter | 5.8 |
| 7 | Recovered water From #6, 1.0 g tailings, 2 hours agitation, 0.45 um filter | 3.3 |

*Fig. 7A*

Mercury Sorption From Area 1 Pit Water by Successive Tailings Treatments

Second experiment (4 successive treatments)

| Test # | Description | Hg Concentration (ng/L) |
|---|---|---|
| 1 | Area 1 Pit water as received, No tailings, no agitation, no filtering | 1.0 |
| 2 | Duplicate of #1 | 0.9 |
| 3 | Area 1 Pit water, No tailings, 4 x1 hour agitations, 4 filtering steps with 0.45 um filter. | 1.1 |
| 4 | Calculated "spiked" concentration | 12.0 |
| 5 | Spiked Area 1 Pit water, four successive treatments with 1.0 g Type 2 tailings, 4 filtering steps with 0.45 um filter. | 8.3 |
| 6 | Spiked Area 1 Pit water, no tailings, 4 filtering steps with 0.45 um filter | 2.0 |

*Fig. 8A*

Mercury Filter (TM) Data all data is nanograms per liter determined by EPA method 1631 unless otherwise noted
all bench tests were done in a 200 ml container with one hour agitation of media and waste water

| Test Number | Test Run or Bench Trial | Input A Total Hg | Input B Total Hg | Average Input Total Hg | Output A | Output B | Output C | Average Input Dissolved Hg* | % Reduction |
|---|---|---|---|---|---|---|---|---|---|
| 1 | Iron Nugget Plant Bench Runs on High Hg Scrubber Water | 374 | 399 | 387 | 34.0 | 48.0 | | 41.0 | 89.4% |
| 2 | Iron Nugget Plant Bench Run #1 | | | 12.0 | | | | 5.8 | 51.7% |
| 3 | Iron Nugget Plant Bench Run #2 (succession on 1) | | | 5.8 | | | | 3.3 | 43.1% |
| 4 | Iron Nugget Plant Bench Run #3 (four successive runs) | | | 12.0 | | | | 8.3 | 30.8% |
|  | Stationary Pilot Plant on Iron Nugget Scrubber Blowdown | | | | | | | | |
| 5 | Trial 7 (36 hrs ten pairs of samples) | | | 6.96 | | | | 0.40 | 94.3% |
| 6 | Trial 8 (36 hrs ten pairs of samples) | | | 8.11 | | | | 0.76 | 90.6% |
| 7 | Coal Fired Power Plant Scrubber Blow Down Run #1 | | | 4.60 | 0.60 | 0.60 | 0.70 | 0.63 | 86.2% |

*Fig. 10A*

Mercury Filter (TM) Data all data is nanograms per liter determined by EPA method 1631 unless otherwise noted
all bench tests were done in a 200 ml container with one hour agitation of media and waste water

| Test Number | Test Run or Bench Trial | Input A Total Hg | Input B Total Hg | Average Input Total Hg | Output A | Output B | Output C | Average Input Dissolved Hg* | % Reduction |
|---|---|---|---|---|---|---|---|---|---|
| 8 | Small City #1 WWTP Bench Run | | | 6.50 | 1.00 | 1.30 | | 1.23 | 81.0% |
| 9 | Small City #2 WWTP Bench Run | | | 1.60 | | | 1.40 | 1.00 | 37.5% |
| 10 | Large WWTP East Inflow Bench Run #5 (mostly Municipal waste water) | 16.0 | 13.4 | 14.70 | 2.4 | 2.6 | | 2.50 | 83.0% |
| 11 | Large WWTP West Inflow Bench Run #6 (mostly Industrial waste water) | 21.0 | 16.7 | 18.85 | 3.4 | 3.2 | | 3.30 | 82.5% |
| 12 | Coal Fired Power Plant Scrubber Blow Down WW Run through Portable Pilot Plant at 3 gpm for 3 hrs | 4.0 | 4 | 4.00 | 0.25 | 0.25 | 0.5 | 0.33 | 91.7% |

* (particle bound is removed by process so in line filtering at 0.45 micron used as a proxy for final filter step of the Mercury Filter ProcessTM)

*Fig. 10B*

| STREAM ID | 814 | M1-01 | M1-02 | M1-03 | M1-04 | M1-05 | M1-06 |
|---|---|---|---|---|---|---|---|
| Stream Name | Waste Water Treatment Discharge | Spent Media from MF #2 to MF #1 | MF #1 Mix Tank Discharge | MF #1 Clarifier Underflow to Mix Tank | MF #1 Clarifier Overflow | Spent MF #1 media to Slurry Tank | Plate/Frame Filter Feed |
| Total Flow - Normal (gpm) | 454.00 | 16.98 | 1044.06 | 472.01 | 438.01 | 16.79 | 120.26 |
| Water Flow - Normal (gpm) | 454.0 | 16.3 | 1025.4 | 454.0 | 438.0 | 16.2 | 101.6 |
| Media Flow - Normal (lb/hr) | 0.0 | 908.0 | 26150.4 | 25242.4 | 9.9 | 898.1 | 865.7 |
| Mercury (ng/l) | 200 | | | | 20 | | |
| Percent Media | 0.0% | 10.0% | 5.0% | 10.0% | | 10.0% | |
| Media Abs. Volume (gal/min) | 0.00 | 0.65 | 18.66 | 18.01 | 0.01 | 0.64 | 0.62 |
| Media Concentration (mg/liter) | 0 | 111053 | 50938 | 111053 | 45 | 111053 | 17012 |
| | | | | | | | |
| Chemical Addition (lb/hr) | | | | | | | |

*Fig. 12A*

| STREAM ID | M1-07 | M1-08 | M2-01 | M2-02 | M2-03 | M2-04 | M2-05 |
|---|---|---|---|---|---|---|---|
| Stream Name | Spent Media to Landfill | Plate/Frame Filtrate to Process Water Hot Well | MF #1 OF to MF #2 | Fresh MF Media to MF #2 | MF #2 Mix Tank Discharge | MF #2 Primary Clarifier Underflow to Mix Tank | MF #2 Primary Clarifier Underflow to Slurry Tank |
| Total Flow - Normal (gpm) | 1.19 | 101.07 | 438.00 | 0.63 | 894.00 | 455.38 | -0.97 |
| Water Flow - Normal (gpm) | 0.6 | 101.1 | 438.0 | 0.0 | 876.0 | 438.0 | -0.9 |
| Media Flow - Normal (lb/hr) | 865.7 | 0.0 | | 876.0 | 25228.8 | 24352.8 | -51.9 |
| Mercury (ng/l) | | | 5.0 | | | | |
| Percent Media | 75.0% | 0.0% | 0.0% | 100.0% | 5.0% | 10.0% | 10.0% |
| Media Abs. Volume (gal/min) | 0.62 | 0.65 | 0.00 | 0.63 | 18.00 | 17.38 | -0.04 |
| Media Concentration (mg/liter) | | | | | 57523.91 | 111053.1 | |
| Chemical Addition (lb/hr) | | | | | | | |

*Fig. 12B*

| STREAM ID | M2-06 MF #2 Primary Clarifier Overflow to Secondary Clarifier | M2-07 MF #2 Secondary Clarifier Overflow to Multimedia Filter | M2-08 Final Discharge to Second Creek (SD-001) | M2-09 Back Flush Water to Multimedia Filter | M2-10 Multimedia Filter Back Flush to Slurry Tank | M2-11 MF #2 Secondary Underflow to Slurry Tank | M2-12 Ferric Chloride to MF #2 Secondary Clarifier | M2-13 Anionic Polymer to Secondary Clarifier |
|---|---|---|---|---|---|---|---|---|
| Stream Name | | | | | | | | |
| Total Flow - Normal | 864.01 | 864.00 | 864.00 | 86.40 | 86.40 | 0.03 | | |
| Water Flow - Normal | 864.0 | 864.0 | 864.0 | 86.4 | 86.4 | 0.02 | | |
| Media Flow - Normal | 19.9 | 3.5 | 0.4 | 0.0 | 3.0 | 16.4 | | |
| Mercury (ng/l) | 1.0 | 1.0 | <1 | | | | | |
| Percent Media | | | | | | 60.0% | | |
| Media Abs. Volume | 0.01 | 0.00 | 0.00 | 0.00 | 0.00 | 0.01 | | |
| Media Concentration | 46 | 8 | 1 | 0 | 70 | | | |
| Chemical Addition | | | | | | | 8.65 | 1.73 |

*Fig. 12C*

PROCESS, METHOD AND SYSTEM FOR REMOVING MERCURY FROM FLUIDS

CROSS-REFERENCE TO RELATED APPLICATION

The present application claims priority to U.S. Provisional Patent Application No. 60/680,941, filed May 12, 2005, entitled PROCESS, METHOD AND SYSTEM FOR REMOVING MERCURY FROM FLUIDS, which is hereby incorporated by reference herein in its entirety.

BACKGROUND

Waste fluid containing mercury can pollute the air, streams, bodies of water and groundwater with unacceptable levels of mercury when discharged without treatment or without removal of mercury to obtain acceptable levels. Mercury pollution in the environment is thought to result in large part from mercury emissions in flue gases from coal fired power plants, taconite indurating plants, blast furnaces, sinter plants, coking ovens, bee hive charcoal ovens, calcining furnaces, cupula furnaces, smelters, and various other industrial and municipal furnaces and incinerators that combust coal or heat treat various inputs. The combustion and/or heat treatments are believed to volatilize mercury that is otherwise contained in one or more of the inputs to the high temperature processes. Once emitted in flue gases, airborne mercury is deposited into bodies of water, streams and groundwater via precipitation. The emissions of flue gases with mercury contribute to mercury deposition with precipitation great distances from the air emission source thus making the mercury removal a global concern. Mercury contamination of water in the environment results in the entry of mercury contamination into the food chain, where it can become concentrated to dangerous levels. The effective removal of mercury from these types of flue gases is believed to be critical to reducing the mercury content in aquatic life including fish so that fish can be safely eaten without danger to the animal or human consuming the fish. The bioaccumulative nature of mercury through the food chain in aquatic systems requires mercury removal from both air and water down to very low concentrations.

Mercury contamination can also enter the environment via waste water discharge from industrial and/or municipal plants. Given the increasing attention that is being given to reducing mercury pollution by multiple governmental bodies, and more rigorous permitting requirements that are being established to minimize impact of mercury on the environment when the waste fluid is discharged, the effective removal of mercury from waste fluid is becoming increasingly necessary for various manufacturing processes to meet these regulations. There is a great need for improved systems for removing mercury from fluids, including liquid and gaseous fluid streams. The present invention addresses this need.

SUMMARY

There are provided methods, processes and systems that employ mercury-adsorbing granular materials as a sorbent reagent to remove mercury from fluids. The fluids can be waste fluids that result from manufacturing, processing, production, treatment, generation, cleaning, recycling, or other systems. The fluids can also be fluids that do not result as waste from a process or system, but rather are fluids from other sources that require remediation. The fluids to be treated may be in the form of water, air, sludge, slurries, gases from processing or furnaces flues, gaseous flows, liquid flows, and other gases and liquids.

The sorbent reagents can be mixed with the waste fluid by injection, by admixing in a flowing stream of the fluid, by mixing in a batch treatment method, or other mixing method. In one form, the sorbent reagents include taconite tailings having the form of a finely divided particulate siliceous material that attracts and attaches or bonds with mercury to remove it from the fluid. It is not intended that the term "bonds" be limited to any specific type of bond, and is certainly not limited to chemical bonds. Rather, this term is interpreted to refer broadly to any attractive force sufficiently strong to hold mercury to the sorbent under the processing conditions encompassed by the invention. Taconite tailings, which are by-products of taconite beneficiation processes, are inexpensive and readily available, particularly in areas having taconite mining and metal production facilities. Taconite tailings can be in form of particles ranging from a coarse size, similar to beach sand, to a fine tailing size ranging from about a millimeter to a few microns in particle size.

In a further form, finely sized taconite tailings are employed as a sorbent reagent. In particular, taconite tailings having an average particle size of from about one micron to about 100 microns are used in one preferred embodiment. Fine tailings are thought to have a greater capacity per unit of mass to adsorb mercury than more coarse tailings and thus are believed to work more effectively as a sorbent.

Other forms of the invention contemplate other types of sorbent. In various alternate embodiments of the invention, the sorbent can include one or more members selected from the following exemplary list: wash plant tailings generated from hydraulic cleansing plants previously employed on the Mesabi Iron Range to upgrade hematite iron ores, finely ground hematite iron ores, finely ground taconite ore or other components of the Biwabik Iron formation or other similar iron oxide and silicone oxide bearing rock types, other chert or slate materials, other materials including microcrystalline quartz, other materials including calcedonic silica, other materials including opaline silica, glacial till or glacial overburden. Glacial till typically contains granular materials high in silica, alumina, iron oxides, and various other oxides, carbonates and minor amounts of other minerals including carbonates, oxides, sulfides and sulfates.

In yet a further form, taconite concentrate is employed as a sorbent. Taconite concentrate is high in concentration of the mineral magnetite with minor amounts of silica, hematite and other minerals.

These and other aspects are discussed further below.

BRIEF DESCRIPTION OF THE DRAWINGS

FIG. 1 is a table of calculated waste water chemistry and achievable model water chemistry.

FIG. 2 is a table of indicating locations and grain size distribution of tailing samples.

FIG. 3 is a table of mineral composition of three tailing types created from the tailing samples.

FIG. 4 is a table providing an equilibrium verification and comparison of glass and plastic testing containers on mercury concentration in model water.

FIGS. 5A, 5B and 5C include a table of model water preparation and analysis data, a table of experimental results and a graph of mercury sorption versus mass of the tailing to demonstrate experimental results of the capacity and effect of tailing properties on mercury sorption.

FIG. 6 is a table of the effect of tailing treatment on the whole model water chemistry.

FIGS. 7A and 7B are a table and bar graph of the mercury sorption of pit water by two successive tailings treatments.

FIGS. 8A and 8B are a table and bar graph of the mercury sorption of pit water by four successive tailings treatments.

FIG. 10 is a table of data summarizing certain pilot plant and bench trials of multiple applications of the invention as described herein.

FIG. 12 is a table of mass flow rate data for various flow streams depicted in the process flow diagram of FIG. 11.

DETAILED DESCRIPTION

Figure 5C:
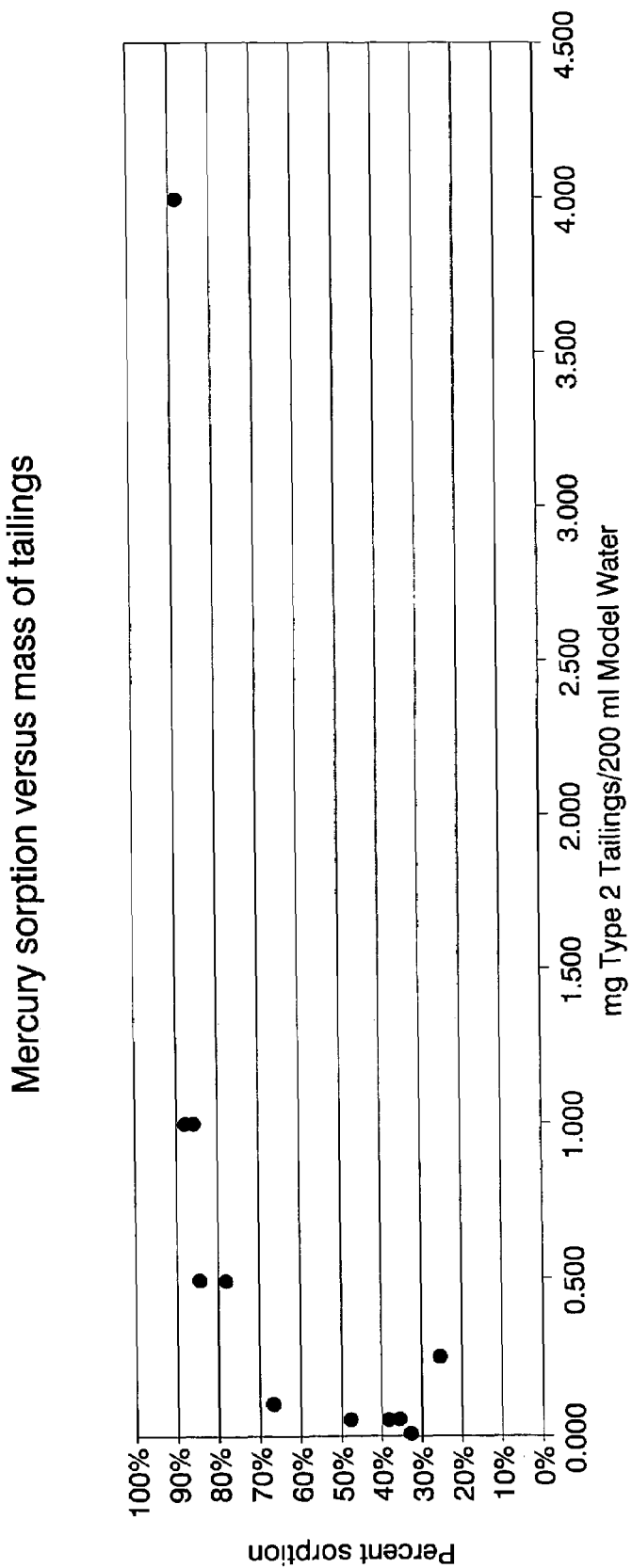

For the purposes of promoting an understanding of the principles of the invention, reference will now be made to the embodiments illustrated in the figures and specific language will be used to describe the same. It will nevertheless be understood that no limitation of the scope of the invention is thereby intended. Any such alterations and further modifications in the described devices, systems, processes and methods, and such further applications of the principles of the invention as described herein are contemplated as would normally occur to one skilled in the art to which the invention relates.

Methods, processes and systems are contemplated that employ mercury-adsorbing granular material, such as mercury-adsorbing siliceous granular material, as a sorbent to remove mercury from fluid. The mercury-adsorbing granular material can be injected or admixed into the fluid. The fluid remains in contact with the sorbent a sufficient time for the sorbent to adsorb mercury from the fluid. The mercury-laden sorbent can then be separated from the fluid for disposal or can be recycled for additional uses. The treated fluid also can be recycled for further use in the method or process, can be contacted with additional sorbents for treatment of further fluid, or can be discharged. The sorbent with partial loading of mercury or other metals may be recycled and reused as a sorbent until effectively loaded with mercury and considered a spent sorbent ready for disposal.

In one form, the granular material includes taconite tailings. In further forms, the granular material includes other mercury-adsorbing materials such as, for example, other chert or slate materials, other materials including microcrystalline quartz, other ground or finely divided materials including wash plant tailings, semi-oxidized taconite, slaty taconite, cherty taconite, calcedonic silica, and/or opaline silica. In yet another form, the mercury-adsorbing granular material is glacial till or glacial overburden. In another form, a process for treating a fluid for mercury removal includes employing taconite with high magnetite concentrations. While various embodiments described herein refer to the use of taconite tailings, it is to be understood that the invention also contemplates the use of alternative mercury-adsorbing granular materials in addition to or in the place of taconite tailings.

In accordance with the invention, a fluid to be treated is contacted with the mercury-adsorbing granular material in a manner and for a time sufficient to cause at least a portion of the mercury present in the fluid to be adsorbed onto particles in the material. Contact can be achieved in many alternative manners in accordance with the invention, and many systems are described herein for contacting the sorbent to a treatment fluid; however, it is not intended that the invention be limited to the specific embodiments shown and described. It is an aim in most systems to optimize contact between the sorbent and the fluid to thereby optimize sorption of mercury from the fluid. This can be achieved, for example, by providing a sorbent having a high surface area, while also providing sufficient flow of the fluid into contact with the sorbent. An example of one manner of achieving contact involves flowing the fluid through a bed or other unit containing the granular sorbent. The flow of the fluid through the sorbent can be assisted, for example, by flowing the fluid vertically through the bed or unit such that the force of gravity assists flow, or by providing a force behind the fluid using, for example, fluid pumps.

In another manner of achieving contact between the fluid and the sorbent, the fluid to be treated, also referred to herein as a "treatment fluid," is passed through a sorbent reactor, also referred to herein as a "contactor" or "mixer" or "mix tank," that is configured to contain the sorbent. In one embodiment, where the fluid is treated in a continuous flow manner, the reactor includes a housing having at least one filter for containing solid sorbent particles inside the reactor during operation as the treatment fluid flows therethrough. The filter can be, for example, a screen that defines apertures of a predetermined size, the size preferably being correlated to the particle size of the sorbent, to thereby retain the sorbent particles in the reactor while allowing passage of the treatment fluid therethrough at an acceptable rate. The filter within the reactor can have a wide variety of configurations, and the selection of a filter configuration can be based on the performance and practicalities of the various options. In other embodiments, other structures are used to separate the sorbent solids from the treatment fluid after a sufficient period of contact. A rotor inside the reactor can facilitate contact between the solid particles in the reactor and the treatment fluid, and can prevent accumulation of sorbent particles next to the filter, if present, which would decrease the rate of treatment fluid flow. The rotor may also effect or assist transport of the treatment fluid through the filter.

Thus, in accordance with one aspect of the invention, the reactor can include one or more of: a treatment chamber for treating the treatment fluid; a sorbent material contained in the treatment chamber; one or more filters or other sorbent retention means to contain the sorbent suspension within the treatment chamber; and one or more means for mixing the contents including the sorbent suspension, the treatment fluid, and/or any other added components, in the reactor. The reactor can also include a means for clearing the surface of the one or more filters or other retention means, such as, for example, by means employing mechanical and/or hydraulic action. The one or more filters in the reactor, if present, can have one or more of the following features: the filters can be disposed on or about the periphery of the treatment chamber, the filters can contain certain contents within the treatment chamber, and the filters can be supported in such a manner as to allow free passage of treatment fluids therethrough.

The means for mixing the contents of the reactor can include any one or more of the following features: a rotating element that extends substantially the length of the chamber and a mechanism for imparting rotary motion to the rotating element, such as, without limitation, various electrical, mechanical, magnetic, and hydraulic drive systems. The rotating element can include blades or baffles, which can optionally be positioned in close proximity to the filter. The mixing apparatus can generate forces to pump the chamber contents either into or out of the reaction chamber. In a system in which a blade or baffle of a rotor is placed in close apposition to the filter, rotation of the rotor scrapes or provides shear or other hydraulic action that lifts sorbent particles from the filter surface. Another approach is to intermittently reduce or stop outflow, thereby reducing or zeroing pressure across the filter, allowing the rotor to lift sorbent particles off the filter. Such a procedure can also optionally include forcing some fluid backwards across the filter to lift particles from the surface. Still yet another approach is to shunt the sorbent suspension from the perimeter (or circumference) of the reactor to flow across the surface of the filter in a direction parallel to the axis of the rotor to an end of the reactor, and then back toward the center, i.e., axis, of the reactor chamber. This, in effect, attenuates or short-circuits the centrifuge effect of a rotating rotor or mixer. This procedure can include providing additional shunt chambers within the interior of the reactor.

Thus, one preferred sorbent reactor includes a treatment chamber, passages for treatment fluid to enter the treatment chamber, a particle-rejecting filter, passage for treatment fluid that has traversed the filter to exit the reactor, and a mercury-adsorbing sorbent material contained within the treatment chamber. The sorbent suspension can include, for example, taconite tailings, other chert materials, other materials including microcrystalline quartz, other materials including calcedonic silica, other materials including opaline silica, glacial till, glacial overburden, taconite with high magnetite concentrations, other sorbent compositions described herein, and mixtures thereof. Alternatively, the sorbent material can include taconite tailings, silica sand, finely ground mixtures of magnetite and silica, finely ground mixtures of hematite with minor amounts of silica, magnetite, maghemite and other oxides of less than 5% by weight, finely divided glacial till, finely divided glacial overburden, ground glacial till, ground glacial overburden or mixtures thereof. The treatment fluid flows into the reactor and intermixes with the sorbent material. The filter is selected to allow the treatment fluid to cross the filter while filtering out the sorbent particles, thereby retaining the sorbent suspension in the sorbent reactor. The filtered treatment fluid may recirculate through a second, and possibly subsequent sorbent reactors if additional mercury removal from the treatment fluid is desired after passage through the first sorbent reactor.

Alternative approaches for separating the treatment fluid from the sorbent material can be employed in addition to or in place of those described above. For example, in another embodiment of the invention, a reactor can have many of the same features as described above, and the fluid can simply be introduced into the reactor; contacted with the sorbent material for a period of time, i.e., with stirring, shaking, agitating, or other means for achieving dynamic contact between the fluid and the sorbent; and then removed from the reactor at a location above the level of the sorbent, which is heavier than the fluid, and thus tends to fall toward the bottom of the reactor due to the force of gravity. In some embodiments, the fluid is drawn from the reactor in a continuous manner. In such embodiments, it may be desirable to run the fluid into a second and possibly subsequent reactors to incrementally reduce the mercury content of the fluid with each successive treatment. In another embodiment, the fluid is treated in a batch manner. In such a system, the fluid can be introduced into a reactor with the sorbent material, agitated for a period of time sufficient to cause mercury from the fluid to adsorb to the sorbent material, and then separating the fluid from the sorbent material.

In other embodiments, after the treatment fluid and sorbent mixture is agitated for a sufficient time to achieve mercury adsorption, the entire slurry can be pumped through filters or screens to separate the sorbent particles from the treatment fluid. In one preferred manner of practicing the invention, granular sorbent particles are separated from the treatment fluid using screens, and the sorbent media comprises a collection of taconite tailings particles that have defined particle size features. In one preferred embodiment, the sorbent particles are fine enough to (1) provide adequate surface area for good potency of mercury sorption per unit weight of media, (2) not cause excessive wear to pumps, pipes, and agitator blades and (3) not cause sanding problems in pipes, and coarse enough to provide for ready separation from the liquid by passing the treatment fluid through screens after the mercury has bonded to the media. This embodiment is particularly desirable when one wishes to create clarified clear water acceptable for discharge to the environment. Of course, in order to practice this aspect of the invention, the sorbent particles desirably have relatively closely controlled dimensions.

One aspect of the present invention involves separating taconite tailings into particular size fractions. For example, size fractions can be isolated by means such as hydro or pneumatic cyclones or other centrifugal techniques such as air separators, hydro separators, Humphrey spirals or jig tables, or more preferably by conventional screening using either wet or dry screens with or without vibration or vacuum assist. A preferred size fraction of taconite tailings media for use in connection with the invention is one in which nearly all particles pass through a 60 mesh screen but nearly all are retained on a 500 mesh screen. The phrase "nearly all" is used to account for the fact that the invention contemplates the use of standard separation procedures, and that screen separations have some degree of inherent variability due to particle-to-particle and particle-to-screen interactions. Another preferred size fraction is one in which at least about 99% pass 100 mesh and at least about 95% are larger than and therefore retained on a 400 mesh screen. In another embodiment, a size fraction is used is one in which nearly all particles pass a 100 mesh screen but are nearly all retained on a 325 mesh screen. Bottom sizes larger than 325 mesh, such as, for example, for example 270 mesh and 200 mesh, may alternatively be used in other embodiments.

In this aspect of the invention, a particular size fraction, also referred to as a "specially sized media" is added to the treatment fluid and an adequate opportunity is provided for the sorbent particles and the treatment fluid to mix and in contact with one another. The treatment fluid and media mixture is then separated by passing the mixture (also referred to as a "slurry") over one or more vibrating wet screens such as are typically used in mineral processing applications such as in taconite mineral processing to separate magnetite from silica. Using screens such as Derrick fine screens or Smart Screens, the specially sized media, now carrying mercury that has been adsorbed from the treatment fluid, can then be separated from the liquid treatment fluid by mechanical screening using screen cloth such as 500 mesh, 400 mesh or 324 mesh cloths, depending upon the size parameters of the sorbent fraction. These screen cloths remove nearly all of the media which is larger than these screen cloth openings from the treatment fluid, and the sorbent can then be returned back to the reactor for contact with additional treatment fluid, or it can be transported to additional dewatering steps in preparation for land disposal.

Figure 9:
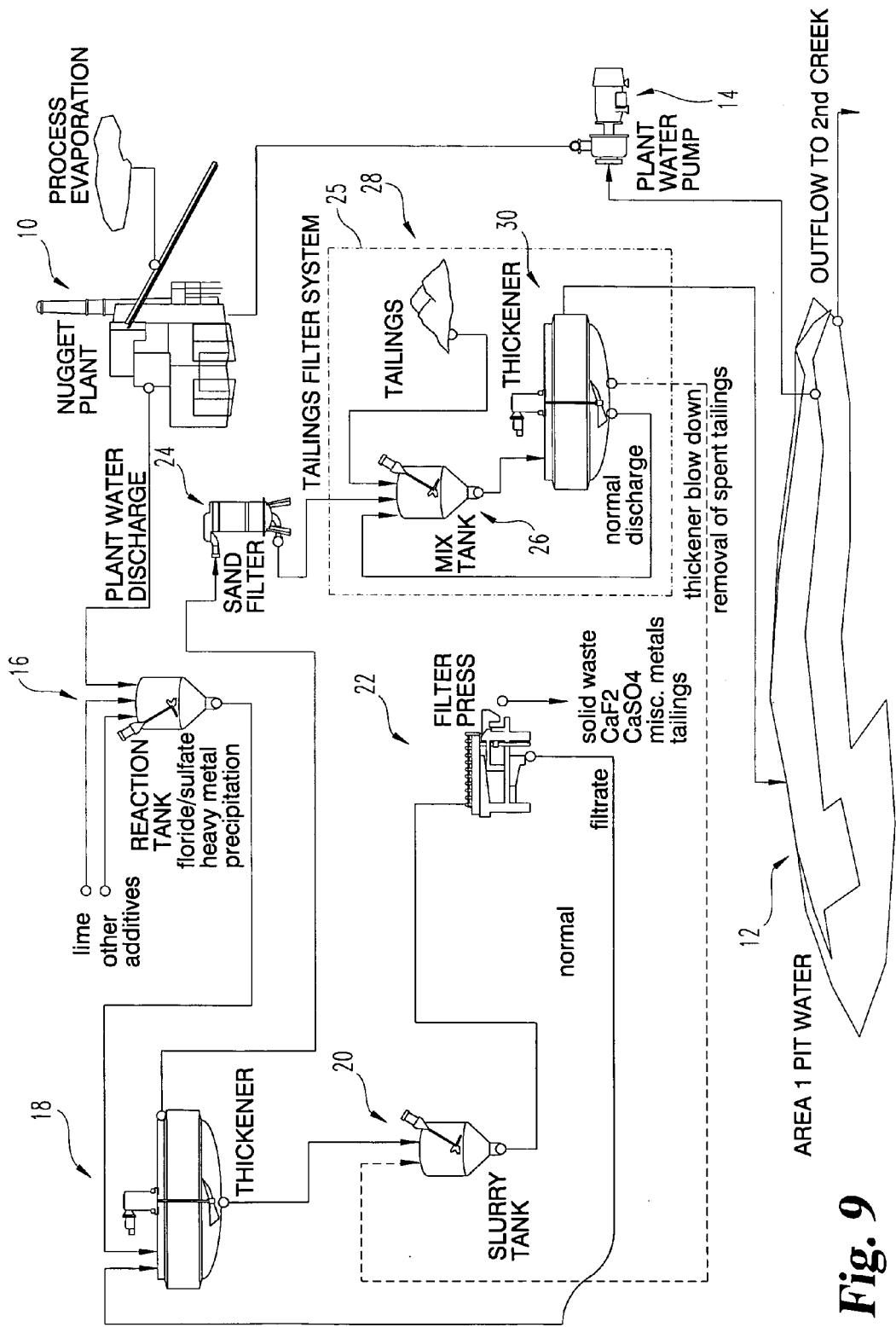
FIG. 9 is a process flow diagram of one specific application of the mercury treatment process and method.

One specific application of the present invention contemplates employing taconite tailings in the treatment of waste water of an iron nugget production facility for removal of mercury. The waste water can result from wet scrubber blow down water and other waste water from the production process. FIG. 9 provides a process flow diagram illustrating one specific application for the mercury treatment process disclosed herein. One specific application contemplates treatment of plant water discharge from a plant 10. In one embodiment, plant 10 is an iron nugget plant. Other embodiments contemplate any other plant type contemplating or requiring treatment of fluid waste for mercury removal.

In the illustrated embodiment, plant 10 receives water from an area pit 12 via a plant water pump 14. Plant 10 produces waste that includes mercury. In one embodiment, the waste fluid containing mercury includes waste formed by reacting coal in the plant operation where flue gases are scrubbed by a wet scrubber using water as the fluid waste containing mercury. The mercury laden fluid waste can be delivered to a treatment system where it is treated with conventional water treatment steps followed by treatment with taconite tailings. In the illustrated embodiment, the mercury waste fluid to be treated is the plant water discharge.

The plant water discharge can be deposited in a reaction tank 16 for an initial treatment and agitation where lime and other additives are added to precipitate fluorides, sulfate, and heavy metals including mercury. The initially treated waste water from the reaction tank is delivered to a first thickener tank 18. The settled water from first thickener tank 18 is delivered to a slurry tank 20 for further agitation and delivery to a filter press 22. Filter press 22 can filter and remove solid waste such as $CaF_2$, $CaSO_4$ and miscellaneous metal tailings. The filtrate from filter press 22 can be returned to first thickener tank 18 for further treatment.

Waste water from first thickener tank 18 is delivered to a sand filter 24. The sand filtered waste water is then delivered to a tailing treatment system 25. Treatment system 25 includes a mix tank 26, a tailing supply 28 and a second thickener tank 30. Tailings from tailing supply 28 can be added to mix tank 26 and agitated with the waste water received from sand filter 24. Sufficient tailings are added and agitation is conducted for sufficient time to achieve the desired sorption of mercury from the waste water.

The tailings treated waste water from mix tank 26 can be delivered to a second thickener tank 30. Normal discharge from the thickener tank 30 can be returned to the mix tank 26 for further tailings treatment of waste water. Thickener blow down including mercury-laden spent tailings can be delivered from thickening tank 30 to slurry tank 20 for agitation and delivery to the filter press 22 for removal of solid waste. Tailing treated waste water from second thickener tank 30 having a suitable amount of mercury removed can be discharged to area pit 12.

It is understood that multiple components of the system depicted in FIG. 9 are optional or can be substituted with other types of mechanisms for achieving the same function (i.e. the fluid to sorbent contacting function and the sorbent separation function), and the invention is not intended to be limited to the specific set forth in FIG. 9. For example, an alternative manner of contacting sorbent particles with a treatment fluid is accomplished by passing the treatment fluid through a multi-media filter that contains the sorbent particles. In this embodiment, separation techniques are not required because the granular sorbent material is contained within the multi-media filter and is not mixed directly with the treatment fluid. The sorbent material preferably forms a distinct portion or layer of the multi-media filter. In this embodiment, taconite tailings, preferably particles of taconite tailings sorted into one or more uniformly sized fractions based on particle size, are used as the filter media in a conventional sand or multi media filter, and the treatment fluid, such as, for example, waste water, flows by gravity or by gravity and pumping pressure assist through the media layers one or more of which is a layer of taconite tailings media. The consequence is that more mercury is picked up by the taconite tailings layer or layers than otherwise would be picked up by just a normal multi media filter which includes, for example, one or more layers of various sizes of silica sand, gravel, garnet, anthracite, or resin.

In another embodiment of a mercury removal treatment system, sorbent media, which can be delivered, for example, in dry form in super sacks, in dry form in pneumatic truck or rail cars, or in wet slurry form in tanker trucks, rail cars or containers, are provided in a suitable receiving bin at the treatment site, in which the media can be stored until its use in accordance with the invention. The receiving bin includes a removal and dosing feeder designed to meter a proper amount of media to a treatment fluid flow path in a controlled fashion. The mixture of treatment fluid and media is optionally fed to a mix tank and mixed by an agitator or bubbler or other mixing device and allowed to remain in contact with each other for a sufficient residence time of at least ten minutes and preferably about one hour to achieve optimum adsorption of mercury to the media. The mix tank can be omitted if the piping system allows adequate contact time and agitation of media and fluid. Next the media is separated from the fluid by a clarifier, cyclone, screen or other suitable fluid/solid separation device and can be either disposed of as a solid at this point or the media can be recycled back to the mix tank or front of the process to provide further opportunity for the media to sorb additional mercury thereby maximizing the mercury sorbed to the media and minimizing the amount of media required to do the task of mercury removal.

A portion of the media stream, normally returning to the mix tank, is split off for thickening and liquid-solid separation by for example vacuum or pressure filtration to generate a filter cake for land disposal and a filtrate that can be returned to the mix tank. The clarified overflow of the clarifier is sent to another thickener or flocculant contact tank after adding coagulant and/or flocculant to coagulate the remaining suspended solids into larger flocs for capture in a multi media filter or membrane filter. If a multi-media filter is used it may employ media including one or more of the following media: gravel, sand, garnet, anthracite, resin, or tailings. The backwash of the multimedia filter is sent to the same collection thickener as is the slipstream of spent media from the clarifier. This allows for control of the solids to liquid ratio to facilitate dewatering by conventional methods such as vacuum filtering in a disk filter or pressure filtration by a filter press to generate low moisture cake suitable for land disposal.

Figure 11:
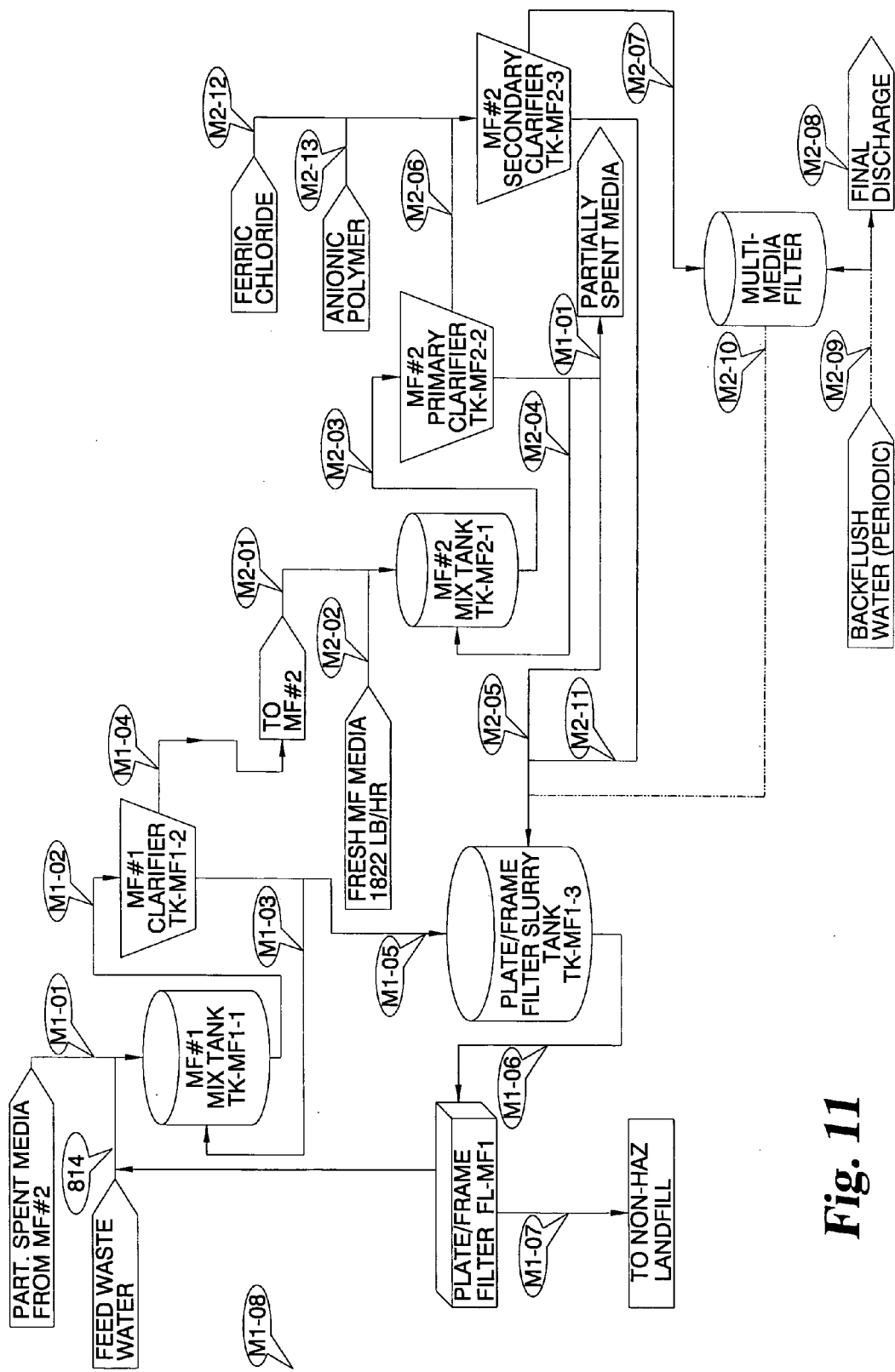
FIG. 11 is a process flow diagram of another application of the mercury treatment process and method.

The sequence of unit process steps as described above can be sized to a variety of flow rates and can be provided with more units in parallel for greater capacity and redundancy to accommodate maintenance. The basic circuit can also be repeated sequentially to provide mercury removal from starting concentrations as high as 30,000 ng/l or more and ending mercury concentrations down to less than 1.0 ng/l. The method can be summarized as follows: a water treatment method using one or more of the following in sequence: media receiving and storage bins, media feeders, mix tanks, clarifiers, recirculation to mix tanks, blow down of spent media to a tank or thickener followed by filtration to make a solid cake for disposal, coagulation of clarifier overflow in a downstream vessel such as another clarifier or tank, followed by multi media filters or membrane filtration to process the clarifier overflow to reduce suspended solids. The final discharge of the multi-media filtration product flow stream constitutes the end of the process with nearly all of the mercury having been removed from this flow. Another embodiment, which is closely related to the system described above, involves elimination of the recycle step and running the same circuit in open circuit fashion with all of the clarifier underflow going to liquid-solid separation to generate a spent cake for land disposal. A flow diagram representing another excellent embodiment of a mercury removal treatment system is depicted in FIG. 11. The stream ID numbers depicted in FIG. 11 are also set forth in the table depicted in FIG. 12, which shows the mass flow rates and related data for each stream of the treatment system. This system is designed for treating a waste water discharge stream having a flow rate of 454 gallons per minute, and having a mercury content of about 200 ng/l.

It is understood by a person of ordinary skill in the art that an inventive system can include two or more sorbent reactor units that run in series and/or in parallel. It is believed that a system including a plurality of sorbent reactor units in series can remove a higher proportion of the mercury content of a treatment fluid than can a system having only a single comparably designed reactor unit. A system including a plurality of sorbent reactor units running in parallel also provides advantages, including, for example, a capacity to treat a greater amount of fluid per unit time than a single comparably designed reactor, and the ability to continue fluid treatment processes even if it is necessary to take one or more reactor off-line for a period of time, for example, to correct a blockage of flow or make other repairs.

Another aspect of the present invention relates to the discovery that the potency of the taconite tailings sorbent can be increased by reducing the average particle size of the granular tailings, i.e., by isolating and using a fraction that has a lower average particle size. In this regard, the present invention provides in one aspect a method to enhance the mercury adsorbing capacity of taconite tailings as a sorbent media by sorting by size the taconite tailings into uniform fractions of similar and rather small particle size. For example the capacity of taconite tailings as a media can be enhanced by removing the bulk of the particles which do not pass through a 40 mesh screen. The capacity of the tailings can be further enhanced by removing the bulk of the particles which do not pass through a 100 mesh screen and the capacity of the taconite tailings based media can be even further enhanced and its performance characteristics can be improved by removing the bulk of particles which do pass through a 200 mesh screen. Depending on the size of the tailings used one can even use tailings advantageously with particles where 80% or more will pass through a 325 mesh screen which has screen cloth opening sizes of approximately 44 micron. Further by excavating the tailings and using either wet or dry methods of size segregation, the tailings can be sorted into relatively uniform size fractions such as the minus 40 mesh, or minus 100 mesh or minus 150 mesh or minus 200 mesh or minus 325 mesh or minus 500 mesh fractions due to the discovery that these uniform and small particle size fractions perform more potently as an sorbent than the complete tailings fractions. One may also extract the tailings directly from the taconite concentrator plant prior to pumping the tailings to a basin and therefore more economically acquire the mercury adsorbing tailings in slurry form without the need for mining them from the basin.

In one embodiment of the invention, high potency tailings produced by methods as described above are added into the treatment fluid at a relatively low ratio of solids to liquid. In one embodiment, for example, sorbent particles are mixed with the treatment fluid at a ratio of from about 0.05 grams per liter to about 20 grams per liter of liquid treated. After dosing to the waste water liquid, the mixture is agitated in a mix tank to achieve at least a 15 minute contact time and more preferably a contact time of at least 30 minutes and still more preferably at least one hour. One may achieve adequate contact time also without a specific mix tank by providing for contact in pipelines or other vessels that may serve other functions such as a holding tank or a clarifier. Turbulence in piping or gravity flow through channels, weirs or pipes may provide adequate contact time and mixing as well. After sufficient contact time as described above, the media particles with mercury adsorbed thereon may then be removed from the liquid by a variety of conventional means such as by clarification with or without the aid of flocculants or coagulants or by membrane filtering, or by multi-media sand filtration with or without pre-coagulation. The captured solids, which represent the spent media containing the sequestered mercury, can then be disposed of after conventional de-watering such as by vacuum or pressure filtration. The resulting filter cake can be put into a land fill of a conventional nature. The solids should not be a hazardous waste due to the relatively low mercury concentration increase of the spent media. Alternatively the spent media in a slurry form can go to a retention pond or basin if one is available for natural dewatering by evaporation.

In one advantageous embodiment, the invention is employed in conjunction with public works waste water treatment plants (WWTPs) for removal of mercury along with conventional treatments of waste waters. Thus, in another advantageous aspect of the invention, there is provided a method for treating municipal waste water to remove mercury by adding a small amount of tailings. This simplified means of water treatment involves less capital equipment and operating costs by concentration of the taconite tailings to a highly potent form and making use of existing equipment capabilities of the WWTP to separate solids from liquids. The tailings derived media can be used either in its unprepared state as reclaimed from a tailings basin or alternatively after preparing the tailings by size sorting as described herein.

The size sorting can be accomplished after reclaiming tailings from a tailings basin or on tailings obtained directly from the taconite concentrator plant that makes the fine tailings originally in a slurry form. The ultra fine tailings fraction is a potent media that can be injected or added to the waste water at any stage early in the WWTP process in a small dosage, such as, for example, at a dose of from about 0.05 grams per liter to about 20.0 grams per liter, depending on the mercury concentration in the influent to be treated and the desired ending concentration of mercury and other mercury reduction capabilities of the WWTP. For a 1000 gallon per minute waste water application, the 0.50 grams per liter dosage would only require about 2.7 metric tonnes of media per day or 986 tonnes per year, which is believed to be an economically feasible amount of media. The high potency media will sequester dissolved mercury onto the media thereby making it particle bound. In this state, the mercury will be isolated from the treatment fluid along with the bio-solids which can be disposed in the conventional fashion or used in a land application function. The addition of the small quantity of media solids to the biosolids adds only a small amount of mass and mercury to the bio solids and should not create a problem with the characteristics, disposal or reuse features of the biosolids. In this fashion the dissolved mercury is removed from the waste water, becomes particle bound to the media and is sequestered to the biosolids where it remains and cannot be bioaccumulated to aquatic organisms, fish, animals and humans.

The basic system components used to achieve this method include storage bins or tanks to accept bags or pneumatic truck delivery of media in dry form or tanker delivery if received in slurry form followed by automatic feeders to feed the media to the influent flow in a ratio to the mass flow rate of the influent water. The media would have the opportunity to mix and react with the WWTP influent water prior to the normal and conventional WWTP steps such as for example screening, thickening and biodigestion, centrifuging. The media would be handled similarly along with the biosolids to which it becomes mixed.

Other applications are also contemplated, including the treatment of waste water and other fluids from other manufacturing, processing, production, treatment, generation, cleaning, recycling, or other systems where removal of mercury is desired. For example, it is believed that the inventive mercury removal procedures, methods and systems will find advantageous use in connection with facilities performing a wide variety of iron reduction processes in which coal, coke or other carbonaceous materials are caused to react with iron oxides in iron ores and other iron oxide sources at high temperatures. In another example, it is believed that the inventive mercury removal procedures, methods and systems will find advantageous use in connection with facilities performing a wide variety of electrical generation processes in which coal, coke or other carbonaceous materials are used to generate steam to spin turbine generators or power generation and where process fluids contain mercury that needs to be removed before emission to the environment.

In another embodiment, the sorbent can be contacted with a liquid treatment fluid in a drain field concept similar to a residential sewage drain field. In this embodiment the mercury laden waste fluid is pumped into a network of drain tile pipes that can be located below the frost line to allow year around operation in cold climates if applicable. The drain tile pipes receive the waste fluid from the generating process and distribute the fluid through a pipe network that provide extensive contact of the fluid with sorbent materials that form the bedding onto which the drain tile pipe is laid. Various sorbents such as taconite tailings along with layers of other sorbents such as magnetite or hematite concentrate or other finely divided siliceous, slaty or cherty materials may be bedded in layers under and around the porous drain tile pipe network buried below the frost line if any. The cleansed fluid may continue on to join ground water or may be advantageously collected in sumps or other ponds, pits or lakes where the fluid collects by gravity. This embodiment is called a "Mercury Earth Filter".

The principles of this invention are also applicable to the treatment of flue gases in facilities performing a wide variety of iron reduction processes, electrical generation processes and the like, in which coal, coke or other carbonaceous materials are combusted and/or caused to react at high temperatures. In one excellent aspect of the invention, there are provided methods for removing mercury from a flue gas by employing a slurry made from water and high potency media as a scrubbing fluid. The sorbent-containing scrubbing fluid is atomized by conventional means typical of wet scrubbers where pump pressurization and atomizing nozzles disseminate the scrubbing slurry or fluid into micro droplets that are contacted with the flue gas, preferably counter-currently to the flue gas flow, in a sequence of chambers to provide an adequate contact time for the scrubbing fluid to interact with the mercury contained in the flue gas so that the mercury can adsorb to the sorbent particles. The scrubbing with the high potency taconite media is preferably performed after fly ash removal is achieved in an example of a coal fired power plant. In this regard, it is sometimes important to prevent mercury contamination of the fly ash which may have byproduct value. Solid waste can then be isolated from the slurry in a typical manner, as described above.

In one preferred embodiment, the scrubbing fluid is made using a taconite medium sorted to a potent size fraction of minus 200 mesh or smaller. This sorbent material is used as a reagent or sorptive media mixed with water in a solution containing a percentage solids ranging from 2% by weight to as high as 50% by weight. In one preferred embodiment, the solids content is from about 10% to about 20%, more preferably about 15%, and wherein an optimal level of dispersion or atomizing can be obtained by conventional pressurized pumping and injection methods commonly known by one skilled in the art. The slurry is preferably contacted with the flue gas in a manner to maximize the interaction of the flue gas and the tailings particles.

In one embodiment, the scrubbing fluid is contacted with the flue gas after the flue gas has been cleaned of sulfur dioxides, fly ash, and other particulates by usual means commonly known and practiced in the trade. The final step of the flue gas treatment in this embodiment is the mercury removal. This approach avoids contamination of the fly ash, which is desirable for the reasons discussed above. The mercury removal step in this embodiment utilizes a chamber or sequence of chambers, which provide an opportunity for injection of the media slurry in finely divided form into the flue gas to provide a suitable duration of interaction and thereby achieve a significant degree of sorption. The interaction phase is followed by collection of the slurry and removal of the solids from the transport water. The solid media in filter cake form after vacuum filtering or filter pressing can be appropriately disposed of in a land fill. The transport water may be reused in the process. In one manner of separating the scrubbing fluid from the flue gas, the flue gas is routed through one or more demisting chambers to remove droplets of slurry from the gas train and direct them to one or more slurry collection containers. A subsequent solids/liquid separation can then be performed by means described herein, such as, for example, coagulation, clarification, multimedia filtration, membrane filtration, vacuum filtration, or sand filtration.

In another embodiment the transport fluid for the sorbent particles in the scrubber fluid is a gas such as air, nitrogen or argon. In this embodiment, the media is entrained in the transport fluid and injected into the flue gas. The scrubber fluid can be injected into the flue gas, for example, immediately after the gas is cooled sufficiently. Alternatively, if it is desired to keep the fly ash for byproduct value, the scrubber fluid can be injected into the flue gas after the flue gas has been cleaned of sulfur dioxide and fly ash by usual means. If the flue gas fly ash is disposable then introduction of the media earlier in the gas train is advantageous subject to consideration of fouling of heat exchangers if any. For example, the scrubber fluid can be introduced into the flue gas at the beginning of the flue gas train after heat exchangers (if used) but prior to de-dusting equipment, such as, for example, fabric filter bag houses, scrubbers, or electro-static precipitators. In this way the scrubber fluid has the opportunity to sorb mercury from the flue gas and then report along with other particulates removed by the de-dusting equipment. The flue gas can be mixed with the scrubber fluid in a chamber designed to maximize mixing and gas interaction with the fluid. The mercury attaches to the sorbent particles and is then removed from the gas along with the sorbent particles by conventional means such as bag filtration, scrubbing or electro-static precipitation.

In another aspect of the invention, a high potency taconite sorbent is imbedded, impregnated, laminated, adhered or otherwise integrated into filter cloth in a form typical of conventional bag houses so that such a sorbent integrated bag can be employed to trap mercury from flue gases onto the sorbent contained in the fabric filter bag. The shape of the sorbent integrated bag can take a wide variety of shapes and constructions, many examples of which are generally known and commonly used in fabric filter bag houses. The filter bags with sorbent particles integrated therein are expected to have a useful life limited only by the mercury content of the flue gas, gas flow rates, gas temperature and chemical composition. Once spent or the mercury trapping capability of the bag is exceeded and the bag no longer is removing an adequate amount of mercury from the flue gas, it would be replaced and disposed of in a land fill of suitable character and capability.

The granular material, which most advantageously is the fraction of taconite tailings smaller than 40 mesh and more advantageously smaller than 100 mesh in particle size, can therefore be used to form a rather uniform particle size collection that offers sufficient surface area for adsorption. It is preferred to avoid packing the sorbent particles too tightly because over-packing can cause gas permeability to be inhibited. In this aspect of the invention, the mercury laden flue gas is forced to pass through the filter cloth and thereby intersect and make contact with the taconite particles that have an ability to adsorb various species of mercury. In alternative embodiments, the filter cloth is one which has been specially prepared with either a coating of taconite tailings, has been imbedded with taconite tailings, or has been pressed or otherwise bonded into a laminated or layered structure that includes one or more layers of taconite tailings within a sandwich structure of the filter cloth. The filter cloth may also be constructed in a way so as to use a small size fraction of the taconite tailings, such as the minus 200 mesh or even the minus 325 mesh fraction which maximizes available reaction surface area of the composite particle collection, but where such small size fraction material is applied and adhered to the filter cloth such that the particles have a sufficient spacing to allow gases to pass through the cloth yet interact with the tailings particles. This requires spatial separation both on the surface of the cloth and also separation in the dimension parallel to the direction of gas flow through the cloth.

In another aspect of the invention, there is provided a method of periodically applying tailings, in either a raw unimproved state or tailings in an improved condition with a high potency for mercury sorption as described above, (1) onto the surface of frozen lakes, streams or rivers, (2) into strategic inflows of lakes, streams or rivers or (3) onto open waters of lakes, streams, or rivers such that the media mixes with a substantial portion of the body of water in the lake, stream or river, adsorbs mercury that may be dissolved in the body of water, and renders the dissolved mercury into a particle bound format that is resistive to conversion to methyl mercury. The taconite tailings media sequesters dissolved mercury, sinks to the bottom of the body of water, continues to sorb dissolved mercury from the water as such mercury comes into contact with suspended and settled tailings. The sorbed mercury then is trapped into a sorbed state attached to the taconite tailings media and is prevented from forming methyl mercury which can otherwise be taken up through the food chain and bioaccumulated into dangerously high concentrations in fish. Ongoing application or dosing or periodic dosing is contemplated as needed per empirical observations.

Reference will now be made to the following Examples, which describe laboratory work that has been performed in support of this invention. It is understood that no limitation to the scope of the invention is intended thereby. The Examples are provided solely to promote a full understanding of the concepts embodied in the invention.

EXAMPLES

Experimental results for treatment of waste water with taconite tailings for removal of mercury indicate taconite tailings provide unexpected results in terms of the high percentage of mercury that is removed from the water. Bench scale laboratory testing employed taconite tailings as a sorption medium. The capacity of the tailings for mercury sorption and kinetics of the sorption were modeled to determine primary design variables for a proposed treatment system. In addition, the experiments characterized the whole change of solute characteristics of the model water before and after treatment with tailings. Testing was further conducted to determine if tailings with distinctly different particle size distribution and mineralogy affected the sorption behavior in significant ways.

DEFINITION OF VARIABLES

Various variables in the experimental design, procedure and data are discussed herein, which are defined as follows:

$t_r$—residence time—the total time the waste water is in contact with the tailings.

$C_t$—Tailings concentration—the mass of tailings per volume of waste water, measured in Units=mass tailings/volume waste water.

$C_s$—solute concentration before exposure to tailings—the mass of each solute in solution per volume of water before exposure to the tailings, measured in Units=mass solute/volume waste water $C_{s\text{-}after}$—solute concentration after exposure to tailings—the mass of each solute left in solution per volume of water after exposure to tailings, measured in Units=mass solute/volume waste water $C_{s\text{-}sorbed}$—sorbed concentration—the mass of solute that has been sorbed onto the tailings, and is calculated by the difference in the $C_s$ and $C_{s,after}$ divided by the $C_t$, measured in Units=mass solute/mass tailings $C_{s\text{-}sorbed,max}$—the maximum mass of the solute that can be sorbed onto a unit mass of tailing, measured in Units=mass solute/mass tailings k—partition coefficient=the ratio of the mass of a solute sorbed to the solid to the concentration remaining in solution, or $C_{s\text{-}sorbed}/C_{s,after}$, measured in Units=mass solute/mass tailings T—temperature Eh—oxidation reduction potential I—ionic strength—the sum of ionic potential contributed by each species in the solution, and can be an important factor in sorption kinetics and capacity where the sorption mechanism is electrostatic.

Experimental Design and Procedure

The sorption of a dissolved species to a solid surface such as tailings is caused by the electrostatic attraction and chemical bonding. Sorption is dependent on the properties of the tailings, such as the number of charged sites and surface area, and the properties of the waste water.

The sorption of a metal to a solid can be represented as an equilibrium chemical reaction. The equilibrium constant for the mass of the metal sorbed to the solid and the mass still in solution over a range of initial solution concentrations is the partition coefficient k. An example for mercury is:

$$Hg_{(aq)} + \text{solid} \rightarrow \text{Hg-solid}$$
$$k = C_{Hg,sorbed}/C_{Hg,after}$$

If the sorption mechanism is simple and without competing reactions, then a plot of $C_{Hg(aq)}$ against $C_{Hg\text{-}solid}$ over a range of concentrations results in a curve that is typically either linear or logarithmic. The curve reaches a point where the solid is saturated with respect to mercury to indicate the capacity of the sorbent.

Example 1

Mercury Sorption Capacity and Kinetics

The first set of batch experiments were performed to determine the $C_{sorbed,max}$ and kinetics of mercury sorption onto one type of tailings under ambient conditions. The ambient conditions were the set of T, pH, Eh and I values created by producing stock solutions of dissolved mercury. To calculate $C_{Hg,sorbed,max}$, a first set of batch experiments were prepared where $C_t$ is varied while $C_{Hg}$ is held constant and $t_r$ is sufficient time for the sorption process to reach equilibrium.

The kinetics of mercury sorption under ambient conditions was determined with another set of batch experiments using $C_t$ and $C_{Hg}$ run near the capacity of the tailings and varying $t_r$. The resulting $C_{Hg,sorbed}$ and $t_r$ were plotted to determine the smallest $t_r$ that achieves $C_{Hg,sorbed,max}$.

Previous experimental work had determined that a minimum $t_r$ of 24 hours was adequate to achieve sorption equilibrium for all $C_t$ tested at that time. In the present experiment, physical agitation with a standard laboratory shaker was employed through the entire $t_r$ to mimic plant conditions. Testing was conducted at a set pH and a set temperature. In order to verify that more $t_r$ is not required to achieve equilibrium, the initial variable testing were set as follows:

| $t_r$ | 24 hours | 36 hours |
|---|---|---|
| $C_{Hg}$ | 100 ng/L | 100 ng/L |
| $C_t$ | 2.0 g/100 mL | 2.0 g/100 mL |

Upon confirmation that a $t_r$ of no more than 24 hours is needed to achieve equilibrium, the ultimate capacity of the tailings was determined with the following parameters:

| $t_r$ | 24 hours | 24 hours | 24 hours |
|---|---|---|---|
| $C_{Hg}$ | 100 ng/L | 100 ng/L | 100 ng/L |
| $C_t$ | 1.00 g/100 mL | 0.50 g/100 mL | 0.20 g/100 mL |

After determining $C_{Hg,sorbed,max}$, the kinetics of the sorption process were determined with the following parameters:

| $t_r$ | 12 hours | 6 hours | 3 hours | 1 hours |
|---|---|---|---|---|
| $C_{Hg}$ | 100 ng/L | 100 ng/L | 100 ng/L | 100 ng/L |
| $C_t$ | 200 mg/100 mL | 200 mg/100 mL | 200 mg/100 mL | 200 mg/100 mL |

Each sample for the variable testing batches were immediately filtered after the prescribed $t_r$ and returned to its original reaction container for analysis per EPA Method 1631 protocol.

Example 2

Model Water Experiments

A second set of batch of experiments was performed on the model water. Model water was prepared to mimic as closely as possible the water from a plant's reactor. The model water contained a variety of solutes including other metals and major and minor ions. The model water fixes $C_{Hg}$ and introduces properties of the waste water that may effect $C_{Hg,sorbed,max}$ and the optimal $t_r$. In the second set of batch experiments, $C_t$ and $t_r$ were varied to determine if k, $C_{Hg,sorbed,max}$ and $t_r$ changed appreciably. The $C_{s,after}$ compared to the $C_s$ for all the solutes for each batch experiment were compared to determine the effect of the tailings on these solutes. The water was tested with the variables at which mercury sorption was optimal in accordance with the following parameters:

| Residence Time | Constant and determined by kinetics in Step #1 |
|---|---|
| Solute Concentration (Hg) | Determined by model water chemistry |
| Tailings Concentration | Four $C_t$ values determined from $C_{Hg,sorbed,max}$ in Step #1 |

Example 3

Tailings Experiments

A third set of batch experiments was also conducted to using tailing with different grain size distributions and mineralogy characteristics. These experiments were designed to determine the effects of these characteristics on sorption.

| Residence Time | Constant and determined by kinetics in Step #1 |
|---|---|
| Solute Concentration (Hg) | Determined by model water chemistry |
| Tailings Concentration | Four $C_t$ values determined from $C_{Hg,sorbed,max}$ in Step #1 |

Test Controls, Analytical Method, and Materials and Apparatus

Parallel with each analytical batch prepared for filtration, two control blanks and two control standards were included. The control blanks uses the same water used for the tailings testing in each of sets of experiments. The control blanks were processed identically to all the samples, with the exception that one control blank was filtered and one was not in order to check the filtration process. The control standards were also prepared for the water used in each of the sets of experiments. The control standards contained the same $C_s$ as the tailing test solutions, except for one control standard was filtered and one was not. Also, each $t_r$ batch test included a laboratory duplicate chosen at random.

Analyses of all samples were conducted per EPA Method 1631 criteria and protocol. Reaction containers were EPA Method 1631 sample bottles, 200 mL column, wide mouth glass bottles with Teflon lined screw caps. The bottles were pre-cleaned and tested per method criteria. The filtration apparatus was an all-glass funnel/support assembly with 47 mm Nylaflow 0.45 micron nylon membrane filter. An Eberbach constant speed (180 excursions per minute) V-belt driven actuating platform with container supports was employed for the standard laboratory shaker. Pyrex/Kimax Class A volumetric flasks and volumetric pipettes of assorted volumes were also employed in the testing. The mercury was Plasma-Pure mercury stock solutions, and stock solutions were used to prepare the model water.

The analytical instrumentation and environmental systems employed include Leeman Labs Hydra AF Gold+ automated mercury analysis system Cold Vapor Atomic Fluorescence Spectroscopy (CVAFS) analyzer with dual gold amalgam traps designed and certified for EPA Method 1631 analysis of mercury. Also employed were Esco Streamline Class 100 Vertical Laminar Flow workstations with HEPA and mercury specific and charcoal specific filtration banks.

Results of Experimentation

Model Water

Based on the experimental protocol described above, the properties of a waste water stream proposed for treatment with taconite tailings was modeled to determine its chemistry. The results of the waste water testing are shown in the table of FIG. 1. Model water for testing purposes was then developed with chemistry similar to the modeled waste water chemistry, as also shown in the table of FIG. 1.

During testing several limitations with regard to producing model water in the laboratory were noted. Many of the stock solutions contain other solutes. For example, the metal cations standards also contain nitric acid and the anions were prepared as either a sodium or potassium salt. The table in FIG. 1 lists final concentrations achievable in the laboratory.

Also, the protocol originally contemplated an ambient pH for the model water created by all the stock solutions used in its production. Many of the stock solutions were acidic and the resulting model water pH was around 2. A pH of 8 was chosen for the model water to represent a waste water after treatment by lime precipitation. Sodium hydroxide was used to adjust the pH, which increased the sodium and dissolved solids. The solubility and speciation of the various anions and cations is pH dependent. Some precipitate formed after adjusting the pH to 8. To avoid losing mercury in the precipitate, the model water was allowed to stand overnight and filtered before adding the mercury standard. An analysis of final whole model water chemistry is included in the table of FIG. 6.

In addition, the DRO, GRO and surfactants created significant matrix interference with the analysis for mercury. These components were deleted from the model water.

Tailings Properties

Geoprobe borings were completed in a tailings basin to obtain taconite tailing samples for use in the experiments. Six borings labeled GP-1 through GP-6 were selected to recover samples that range from coarse to fine fraction particulate sizing. With the exception of GP-1, each boring was completed to 20 feet with continuous samples provided in plastic liners 4 feet long and 1.8 inches in diameter. Each four foot sample was homogenized and a grain size distribution was determined by Minnesota Department of Transportation washed analysis. Laboratory results for the grain size distribution of the six samples are provided in the table of FIG. 2.

From these six borings, three tailing samples were prepared for use in the testing. Type 1 was a composite of all four samples from GP-3 to provide a representative of coarse tailings particle size distribution. Type 2 was a composite of all four samples from GP-5 as representative of fine tailings particle size distribution. Type 3 was a composite of all four samples from GP-6 as representative of medium to coarse tailings particle size distribution. Each of these types was subject to chemical and mineralogical analysis, the results of which are provided in the table of FIG. 3.

Initial Bench Tests

Bench scale experiments employed type 2 tailings except for those specifically designed to measure sorption properties of the three tailing types. When considering the data from the experiments, several points should be considered. The batch experiments required handling of the samples, such as by adding tailings and filtering, that are outside of the protocol of EPA Method 1631. Results that approach the reporting limit of EPA Method 1631 of 0.5 ug/L do not carry the same data quality as results produced in accordance with EPA Method 1631.

Also, a control in which model water was agitated without tailings added was performed along with each batch experiment. In all cases, the mercury measured in the control was less than the concentration calculated from the volume of mercury standard added to the model water. It appears some loss of mercury in solution occurs due to sorption to the reaction container or some other mechanism. EPA Method 1631 requires use of glass or fluoropolymer lined containers and a pH of less than 2. The experiments were conducted at a much higher pH, which is expected to affect the surface properties of the container material. The table in FIG. 4 contains data comparing mercury losses in a control sample run in plastic versus glass, and it is observed that there was not a large difference. In the remainder of the experiments, the percent sorption of the mercury to the tailings was calculated using the control concentration as the beginning mercury concentration to normalize any losses due to the container.

In order to avoid positive bias in the experiments due to mercury sorbed to particles, each bench experiment employed filtering prior to preservation and analysis. The filtering was performed with 0.45 um filters with associated glassware. Similar to the container blank control experiments, several experiments used filter blanks to normalize any bias created by the filtering step.

An initial round of testing was completed to verify that equilibrium between mercury in solution and mercury sorbed to solids is achieved in less than two hours. The data for these experiments is provided in the table of FIG. 4. This set of experiments was performed in glass containers and duplicated in plastic containers to evaluate the significance of the container on mercury losses. Based on the volume of stock standard added, the model water contained 33 ng/L mercury. Four grams of tailings were added to the reaction container. A control consisted of a reaction container without tailings added. Model water batch number 4 was used with an adjusted pH of about 4, which is less than successive experiments where the pH was typically about 8.

The two hour test resulted in approximately 91% sorption while the 25 hour test resulted in approximately 83% sorption. This indicates the sorption reaction is relatively rapid and, at the mercury concentration of the model water, reaches equilibrium in less than two hours. The remainder of experiments was conducted for two hour durations.

Mercury concentrations in the controls were less than the starting concentrations by 6% to 15%, indicating that some portion of the experimental process created a negative bias, likely due to sorption in the container walls. The differences in mercury loss in the glass and plastic containers are generally within the precision and accuracy window indicating there is no statistically significant difference between the container types.

Capacity and Kinetics

FIGS. 5A-5C show sorption data for experiments performed with a mass of tailings ranging from 4.0 grams to 0.01 grams in 200 ml of model water. In this data, percent sorption was calculated using control concentrations rather than the beginning spiked concentrations. FIG. 5C provides a plot of percent sorption versus the mass of tailings. An apparent inflection point in the resulting curve occurs around 0.14 grams and may represent the capacity of the tailings for sorption of mercury. The data further indicates some mass action kinetic effect. For example, three repetitions using 0.05 grams of tailings achieved 38%, 35%, and 48% sorption, which represent a mass of mercury per mass of tailings of 2600 ng/g, 2400 ng/g, and 1460 ng/g. The third point was from an experiment with a beginning concentration (control concentration) half that of the first two data points. If it were a capacity issue, the third data point should have a higher percentage sorption, which would have resulted in a mass of mercury per mass of tailings approaching 2400 to 2600 ng/g.

Effects of Tailings Properties

In FIG. 6 there is shown an analysis of the major components of the model water before and after treatment with the three tailing types. The percent mercury sorption ranges from 91 to 88 between the three tailing types, which is not a sufficient difference to conclude that any of the three types possesses better sorption performance. It is further noted that other components of the model water did not vary significantly after treatment with tailings. It is noted that tin decreased by about 50%, copper and manganese decreased by about 20%, and potassium and magnesium increased by about 20%.

Successive Tailings Treatments

Figure 7B:
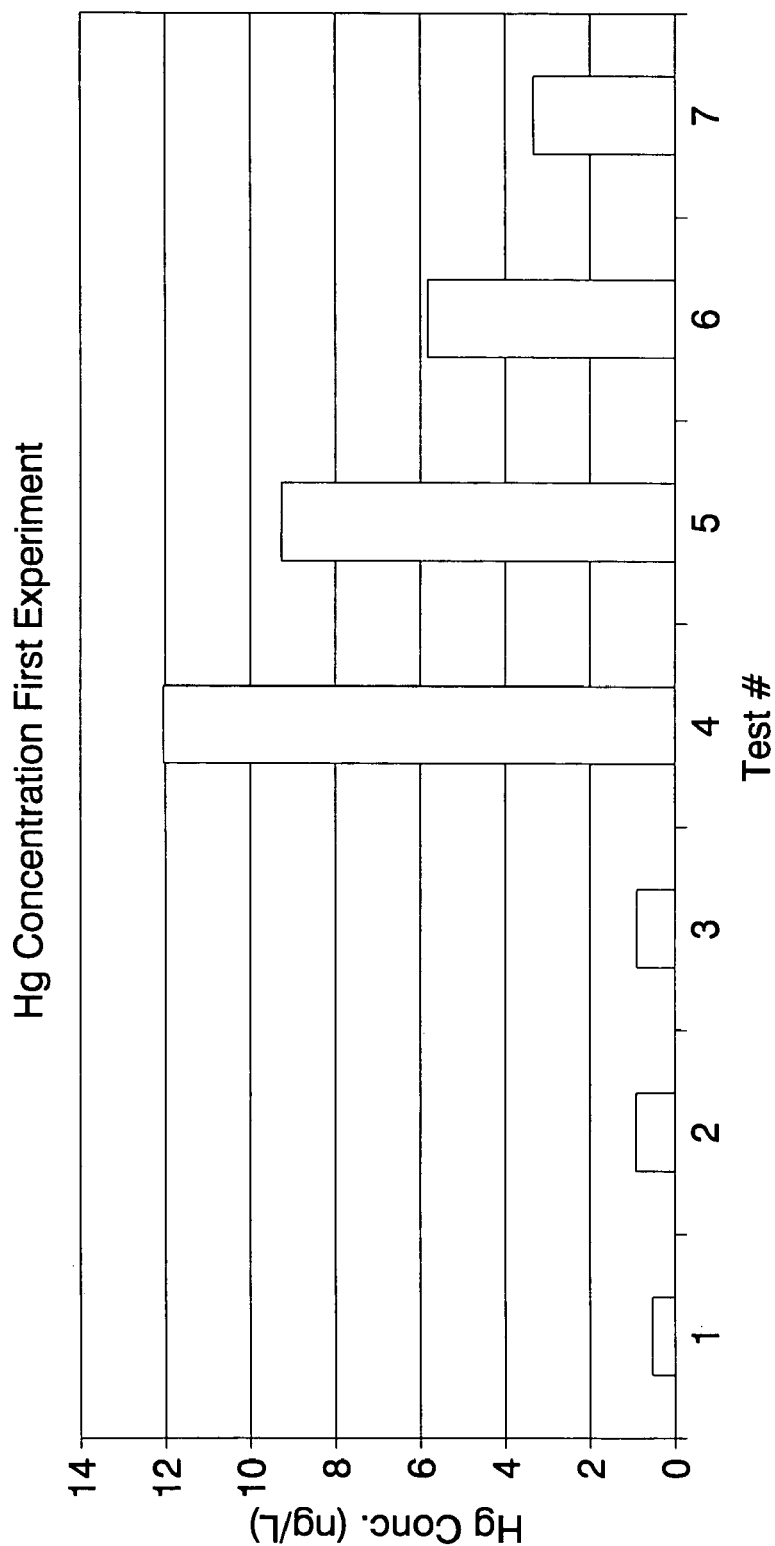
Figure 8B:
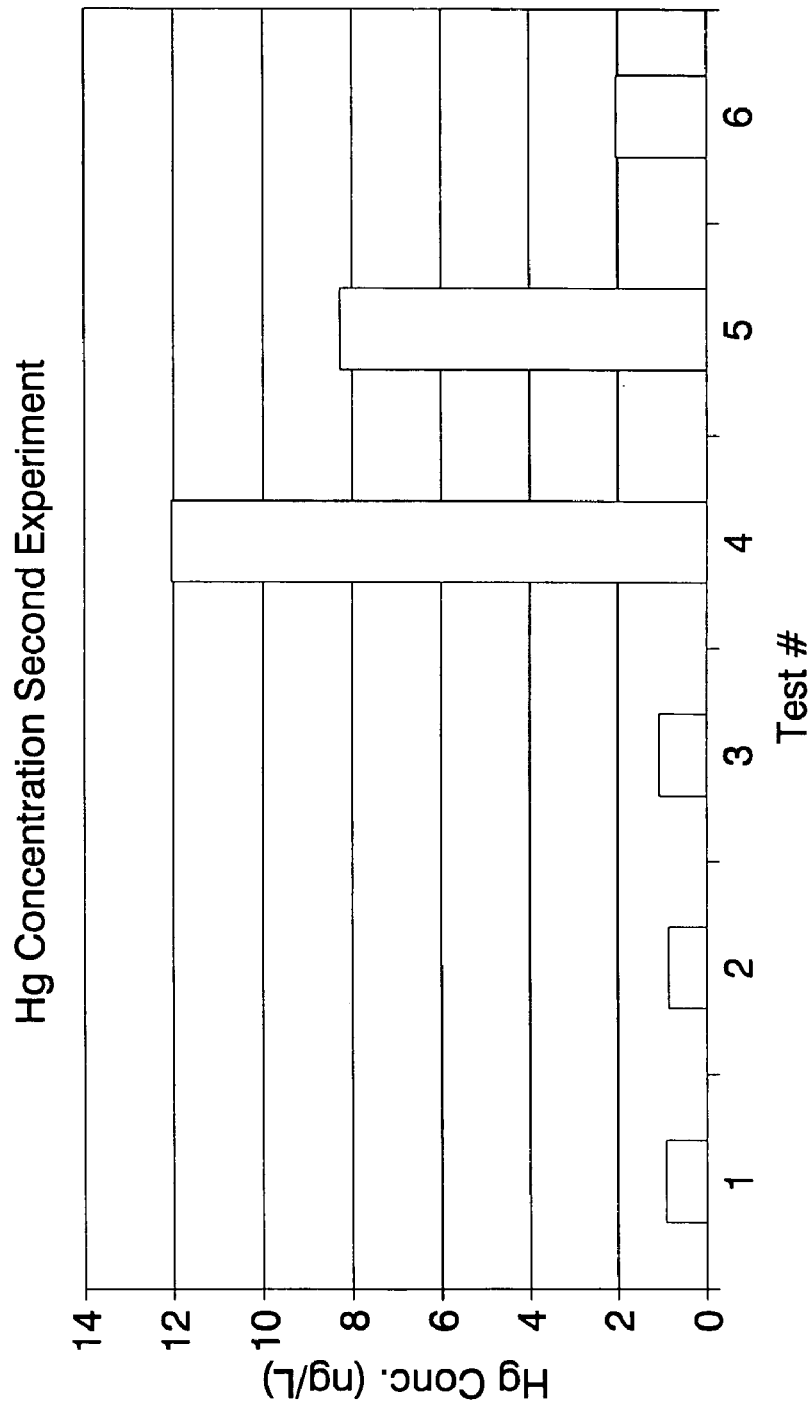

FIGS. 7A and 7B and FIGS. 8A and 8B provide data for two separate experiments where water from a pit tailings was sampled and spiked with mercury. The spiked water was treated by successive loads of 1.0 gram of type 2 tailings. The data in FIGS. 7A and 7B represents two successive treatments resulting in a final mercury concentration of 3.3 ng/L. The data in FIGS. 8A and 8B represents four consecutive treatments resulting in a final mercury concentration of 2.0 ng/L.

Additional Testing

Additional testing was performed using the tailings from the GP-5 geobore and sampled water from tailings pit. The following table provides the results from this additional testing and the mercury sorption capabilities of these tailings.

TABLE 1

Low Level Hg Spike sorption testing using GP-5 Tailings
Processing was 4 reps of 2.0 hour agitations on Standard Laboratory
Shaker and 4 reps of 0.45 um filtering
All tailings masses were 10.0 grams into 200 mL sample volumes

| Sample Description | Conc. Hg measured (ng/L) | |
|---|---|---|
| Sample as received from Area 1 | 0.6 | |
| Sample as received from Area 1 | 0.7 | Duplicate of above |
| Sample from above spiked with Hg to target of 5.0 ng/L | 5.7 | |
| Spiked sample from above exposed to tailings | 0.7 | 1st set of reps |
| Spiked sample from above exposed to tailings | 0.9 | 1st set of reps, duplicate of analysis |
| Spiked sample from above exposed to tailings | 1.7 | 2nd set of reps-duplicate of procedure |
| average of treatment of the 5 ng/l spiked Area 1 water | 1.10 | |

The experimental results demonstrate the potential for taconite tailings to be successfully employed in mercury removal from waste fluids.

Summary of Experimental and Demonstration Bench and Continuous Pilot Tests

A variety of experimental and demonstration tests using small scale bench testing protocols and also using larger scale continuous pilot plant equipment have been conducted. The results of these experimental and demonstration tests are summarized in FIG. 10. A total of twelve discrete tests are cited including nine sets of bench tests and three continuous pilot plant trials at continuous flow rates ranging from 3 gpm to 5 gpm and durations ranging from 3 hours to 72 hours. In all tests cited in FIG. 10 the sorbent used is taconite tailings in either the as received condition from the taconite tailings basin or in some cases the taconite tailings sorptive capability was enhanced by screening off the particles larger than 60 mesh (250 microns). Waste waters for an iron plant were created by generating a model water by spiking the iron plant source plant process water with mercury to simulate the mercury concentration for which the inventive process system under experiment would be used. This is the case for tests 1 through 6. In tests 7 through 11 samples of actual waste waters from various facilities were collected including samples from a coal fired power plant, two small public operated waste water treatment plants, and a large public operated waste water treatment plant. Test 12 is a 3 gpm pilot plant test conducted on a continuous basis over a three hour period treating a final effluent from a coal fired power plant scrubber blow down waste water. In all twelve test sets cited and shown in FIG. 10, the mercury in the waste water treated was substantially reduced. The percentage reduction in mercury concentrations, comparing mercury concentration in the beginning waste water compared to the mercury concentration in the ending water after treatment by the inventive process and methods, ranged from a low of 30.8% to a high of 94.3%. The continuous pilot plant results showed the highest reductions averaging 92.2% for the three pilot plant tests cited. These results provide compelling evidence for the capability of the inventive system, process and methods to remove mercury from fluid waste water.

Various alternative applications for treatment of fluid for mercury removal are contemplated and described herein. One specific example contemplates the treatment of flue gases with siliceous material for mercury removal. In the flue gas treatment example, tailings, iron ore concentrate, ground taconite, wash plant tailings or finely divided silica or alumina or blends thereof are injected into hot flue gases prior to the de-dusting equipment such as a wet scrubber, electrostatic precipitator or bag house where the sorbent and the sorbed mercury are collected and suitably disposed thereof in landfills or other containments. Another specific example contemplates treatment of waste water from an iron nugget production facility for removal of mercury. Another specific example contemplates flowing waste water through a drain field or mound system using conventional drain tile piping laid in trenches bedded with the sorbent materials below frost line if necessary for winter operations to provide seepage of water through sorbent materials and collection of the cleansed water into pits, sumps, ponds or other collection area for reuse or discharge to the environment.

In view of the descriptions and figures herein, a person of ordinary skill in the art will appreciate that one form of the invention provides a process for removing mercury from waste fluid that includes: (1) subjecting a waste fluid containing mercury to a sorbent comprising a siliceous material; (2) mixing the sorbent with the waste fluid to bond at least a portion of the mercury with the sorbent; and (3) separating the waste fluid from the mercury-laden sorbent. In certain embodiments, the process further includes agitating the sorbent in the waste fluid with a mixer. The sorbent material can advantageously be a granular material.

In one embodiment, the sorbent comprises chert. In another embodiment, the sorbent comprises taconite tailings. In still another embodiment, the sorbent comprises a silica containing microcrystalline quartz. In yet another embodiment, the sorbent comprises chalcedonic silica. In a further embodiment, the sorbent comprises opaline silica. In one form of practicing the process, the waste fluid is waste water. In another form, the waste fluid is flue gas.

In another embodiment, the process further includes: (1) filtering the separated mercury-laden taconite tailings by pressure filtration or vacuum filtration to a solid waste; and (2) disposing of the solid waste. In still another embodiment, the process further includes returning the separated waste fluid for mixing with additional sorbent.

In another form of the invention, there is provided a process for removing mercury from waste fluid that includes: (1) subjecting a waste fluid containing mercury to a sorbent comprising taconite tailings; (2) mixing the sorbent with the waste fluid to bond at least a portion of the mercury with the sorbent; and (3) separating the waste fluid from the mercury-laden sorbent.

In yet another form, the invention provides a method for using taconite tailings that includes: (1) mixing the taconite tailings with a waste fluid including mercury to adhere at least a portion of the mercury to at least a portion of the taconite tailings; and (2) separating mercury-laden taconite tailings from the waste fluid. The method can also further include discharging the waste fluid after separating the mercury-laden taconite tailings. In one embodiment, the waste fluid is water. The method can also further include removing the mercury-laden taconite tailings and filtering the taconite tailings by pressure filtration or vacuum filtration prior to solid waste disposal.

In a further form of the invention, there is provided a method for treating waste water from an iron nugget production process that includes: (1) receiving waste water from a plant water discharge; (2) mixing the waste water with taconite tailings in a mixing tank to adhere mercury in the waste water to the taconite tailings; and (3) separating the mercury-laden taconite tailings from the waste water. In one embodiment, the waste water includes waste water from blow down from a wet scrubber. In another embodiment, the wet scrubber scrubs flue gases from burning coal. In yet another embodiment, at least a portion of the waste water is discharged for outflow after separating the mercury-laden taconite tailings. In still another embodiment, at least a portion of the waste water is returned to the mixing tank for mixing with mercury-laden waste water and taconite tailings. In addition, or alternatively, at least a portion of the taconite tailings can be returned to the mixing tank for mixing with mercury-laden waste water and fresh taconite tailings.

In still another form of the invention, a method is provided in which mercury-laden waster water is allowed to flow through a porous pipe network laid in trenches created below ground. In one embodiment, the porous pipes are laid in granular earthen material with the bed of the porous pipe network constructed of taconite tailings as a sorbent material. In one advantageous embodiment, the pipe network is below the frost line. In another embodiment, the cleansed fluid is allowed to collect in a collection reservoir, pit, pond, basin or other container by gravity after seeping from the earthen material and the sorbent network bedding. In one preferred embodiment, the sorbent material is magnetite silica mixture. In another embodiment, the sorbent material is hematite silica mixture. In still another embodiment, the sorbent is ground taconite. In a further embodiment, the sorbent is wash plant tailings. In yet another embodiment, the sorbent is glacial till or overburden.

The invention also provides a process for removing mercury from treatment fluid that includes (1) providing a sorbent comprising a granular material having mercury-adsorbing functionality; (2) mixing a treatment fluid containing mercury with the sorbent in a container or a conduit to provide a mixture in which the sorbent contacts the treatment fluid to adsorb at least a portion of the mercury to the sorbent; and (3) separating at least a portion of the treatment fluid from at least a portion of the mercury-laden sorbent. The process can further include agitating the sorbent in the treatment fluid with a mixer. In one embodiment, the sorbent comprises a sorbent selected from the group consisting of chert, taconite tailings, a silica containing microcrystalline quartz, chalcedonic silica and opaline silica. In another embodiment, the sorbent comprises a sorbent selected from the group consisting of taconite tailings, silica sand, finely ground mixtures of magnetite and silica, finely ground mixtures of hematite with minor amounts of silica, magnetite, maghemite and other oxides of less than 5% by weight, finely divided glacial till, finely divided glacial overburden, ground glacial till and ground glacial overburden. In a particularly preferred manner of practicing the invention, the sorbent comprises taconite tailings. The treatment fluid can be, for example, waste water or flue gas. In the case of flue gas, the mixing can be achieved by injecting the sorbent directly into ductwork transporting flue gases. In a particularly preferred embodiment, the sorbent is mixed with a transport medium. The transport medium used can be, for example, water, argon gas, nitrogen gas, natural gas or mixtures thereof.

In alternative embodiments, the waste fluid can be, for example, a fluid selected from the group consisting of flue gas from a coal fired power plant, scrubber blow down water from a coal fired power plant, fluid discharge from a taconite pellet indurating plant process, flue gas from a wood products production process, and waste water from a wood products production process.

In a preferred embodiment, the granular material comprises taconite tailings having particle sizes whereby at least 80% by weight of the taconite tailings particles are smaller than 60 mesh or 250 microns. In another preferred embodiment, the granular material comprises taconite tailings having particle sizes whereby at least 80% by weight of the taconite tailings particles are smaller than 100 mesh or 149 microns. In yet another preferred embodiment, the granular material comprises taconite tailings having particle sizes whereby at least 80% by weight of the taconite tailings particles are smaller than 200 mesh or 74 microns. In still another embodiment, the granular material comprises taconite tailings having particle sizes whereby at least 80% by weight of the taconite tailings particles are smaller than 325 mesh or 44 microns.

In one manner of practicing the invention, at least a portion of the mixture of sorbent and treatment fluid is passed to a filtration system, and the separating occurs in said filtration system. The mercury-laden sorbent from the portion passed to a filtration system can be collected as a moist solid waste in a filter cake that is removed from the treatment fluid in the filtration system. The solid waste can thereafter be disposed of, for example, in a land fill, pit, basin, pond or other holding location. In another manner of practicing the invention, after at least a portion of the treatment fluid is separated from at least a portion of the mercury-laden sorbent, some or all of the treatment fluid is contacted with additional sorbent.

In one manner of utilizing taconite tailings for the removal of mercury from a fluid, the taconite tailings are positioned as at least one element in a multi-media filter, whereby at least a portion of the mercury in a treatment fluid stream passing through the filter adsorbs to a portion of the taconite tailings, to provide a filter having a dual functionality of removing suspended particles greater than a certain size from the treatment fluid and of binding at least a portion of the mercury in the treatment fluid. Another manner of using taconite tailings includes: (1) mixing the taconite tailings with a treatment fluid including mercury to provide a mixture in which the taconite tailings contacts the treatment fluid to adsorb at least a portion of the mercury to at least a portion of the taconite tailings; and (2) separating mercury-laden taconite tailings from the treatment fluid. The separating can be accomplished by introducing the mixture into a device selected from the group consisting of a clarifier, a lamella, a hydro-separator and a thickener to clarify the treatment fluid, thus producing a clarified fluid. The separating can also include introducing into the device a coagulating agent or a flocculating agent, such as, for example, a polymer, ferric chloride, or alum. After the separating, clarified fluid can be cleansed to remove suspended solids by filtration. For example, the clarified fluid can be passed through one or more multi-media filters that include taconite tailings positioned as at least one element. In one particularly preferred manner of cleansing the clarified fluid, it is passed through one or more multi-media filters; at least one of which includes a medium selected from the group consisting of gravel, sand, fine garnet, coal, anthracite, or taconite tailings. After separating the mercury-laden taconite tailings, the treatment fluid can be discharged.

In one preferred manner of practicing the invention, the granular material used as a sorbent comprises a particle size fraction of taconite tailings having an optimized sorptive capacity. For example, the fraction can be one of the following: (1) a size fraction having particle sizes whereby at least 80% by weight of the taconite tailings particles are smaller than 60 mesh or 250 microns; (2) a size fraction having particle sizes whereby at least 80% by weight of the taconite tailings particles are smaller than 100 mesh or 149 microns; (3) a size fraction having particle sizes whereby at least 80% by weight of the taconite tailings particles are smaller than 200 mesh or 74 microns; or (4) a size fraction having particle sizes whereby at least 80% by weight of the taconite tailings particles are smaller than 325 mesh or 44 microns. Fractions of this type are referred to herein as "high potency" particle size fractions or "potency enhanced" particle size fractions of taconite tailings. In another excellent embodiment, the granular material comprises a particle size fraction of taconite tailings having an optimized dual functionality of sorptive capacity and capacity for being separated from the treatment fluid. For example, the fraction can advantageously be one that was processed to remove a significant portion of the smallest particles. The fraction can be one of the fractions set forth in this paragraph above, further characterized in that the fraction does not include a substantial amount of one of the following: (1) particles that normally would pass through a 500 mesh screen (32 microns) using conventional wet screening techniques and equipment, (2) particles that pass through a 400 mesh (37 microns) screen cloth using wet screening techniques and equipment, or (3) particles that pass through a 325 mesh (44 microns) screen cloth using wet screening techniques and equipment. In this embodiment, because the sorbent particles are carefully sized, the separating of the sorbent particles from the treatment fluid can be accomplished by introducing the mixture onto a wet vibrating screen to pass the treatment fluid therethrough and retain the taconite tailings thereon. In additional embodiments, after the separating, all or part of the taconite tailings are returned to the mixing step to be reused for adsorbing mercury from a treatment fluid. The returning of taconite tailings to the mixing step can be repeated until the capacity of the taconite tailings to bind mercury has been diminished to an unacceptable level, at which time the spent tailings can be discarded. The treatment fluid can be, for example, a waste water influent to or discharge from a municipal waste water treatment plant, a waste fluid from a coal fired power plant, a waste fluid from an iron production plant, a waste fluid from a steel making plant, a waste fluid from an taconite pellet production plant, or a waste fluid from a wood products production plant.

In another form of the invention, there is provided a method for treating waste water entering a municipal waste water treatment plant. The process includes: (1) providing a potency enhanced particle size fraction of taconite tailings as described in the preceding paragraph; and (2) introducing the fraction into an influent waste water stream to the plant at a rate of from about 0.01 grams per liter of influent to about 20 grams per liter of influent. The taconite tailings are preferably entrained within the waste water stream for a time sufficient to allow binding of at least a portion of the mercury in the influent to the taconite tailings. Removal of the tailings from the waste water can be achieved by the separation systems already in place for removing the biosolids that are generated by the plant. The rate at which the fraction is introduced is determined as a function of the desired ending concentration of mercury and the mercury concentration of the influent waste water stream.

In another form, the invention provides a method for treating waste fluids exiting a coal fired power plant including: (1) providing a potency enhanced particle size fraction of taconite tailings as described herein; and (2) introducing the fraction into a waste fluid stream exiting the plant at a rate of from about 0.01 grams per liter of the stream to about 20 grams per liter of the stream. The taconite tailings are preferably entrained within the waste fluid for a time sufficient to allow binding of at least a portion of the mercury in the waste fluid to the taconite tailings. Removal of the tailings from the waste fluid can be achieved by the separation systems already in place for removing the solids from the waste fluid that is generated by the plant. The rate at which the fraction is introduced is determined as a function of the desired ending concentration of mercury and the mercury concentration of the influent waste water stream.

In still another form of the invention, there is provided a method for treating waste water from an industrial production process that includes: (1) receiving waste water from a plant water discharge; (2) mixing the waste water with taconite tailings in a mixing tank to adhere mercury in the waste water to the taconite tailings; and (3) separating the mercury-laden taconite tailings from the waste water. The industrial production process can be, for example, an iron production process or a coal fired power plant process. In one embodiment, the waste water comprises waste water from blow down from a wet wall precipitator. In another embodiment, the waste water comprises waste water from blow down from a wet scrubber. The wet scrubber can be, for example, a wet scrubber that scrubs flue gases from thermal consumption of coal. In one manner of practicing the invention, at least a portion of the waste water is discharged for outflow after separating the mercury-laden taconite tailings. In another manner of practicing the invention, at least a portion of the waste water is returned to the mixing tank for mixing with mercury-laden waste water and taconite tailings. In yet another manner of practicing the invention, at least a portion of the taconite tailings are returned to the mixing tank for mixing with mercury-laden waste water and fresh taconite tailings.

In another aspect of the invention, there is provided a method for removing mercury from an aqueous treatment fluid. The method includes: (1) providing an underground flow path that includes a network of porous conduits embedded in a granular sorbent material; and (2) introducing the treatment fluid into the network such that the fluid is dispersed from the conduits through the sorbent material to provide cleansed fluid. In one embodiment, an applied pressure greater than atmospheric pressure is exerted on the fluid in the conduits. The sorbent material preferably comprises taconite tailings. The network is preferably positioned below the frost line when this aspect of the invention is employed in a geographic area in which freezing is possible. In one embodiment, the cleansed fluid is collected in a collection reservoir by gravity after seeping from the earthen material and the sorbent network bedding. In another embodiment, the collection reservoir is a reservoir selected from the group consisting of a pit, a pond, a basin and a container. The sorbent material can include, for example, a magnetite silica mixture, a hematite silica mixture, ground taconite, wash plant tailings, glacial till and overburden.

In yet another form of the invention, there is provided a method for removing dissolved mercury from a naturally occurring body of water, comprising delivering a mercury adsorbing sorbent into contact with the body of water for a period of time sufficient for at least a portion of the dissolved mercury in the water to bond with at least a portion of the sorbent and settle to the bottom the body of water. Preferably, the binding of the mercury to the particles effectively renders the mercury non-reactive and makes at least a portion of said mercury unavailable for conversion to methyl mercury which can otherwise enter the food chain. In one embodiment, the sorbent is introduced into the body of water for a period of time on a substantially continuous basis. In another embodiment, the sorbent is introduced into the body of water in a batch basis. In one manner of practicing the invention using the batch basis, the sorbent is placed on ice covering a body of water during winter conditions when the body of water is frozen, and thereby contacts the water as the ice melts. In another manner of practicing the invention using the batch basis, the sorbent is introduced in a non-winter season by delivery from a vessel on the open water. In another manner of practicing the invention, using either a continuous basis or batch basis, the sorbent is introduced by delivering the sorbent to strategic locations of inflows to the body of water such that the naturally occurring flow and dissemination mixes and disperses the sorbent into the body of water. In certain preferred embodiments, the sorbent material comprises taconite tailings. In alternative embodiments, the sorbent material is selected from the group consisting of a magnetite silica mixture, a hematite silica mixture, ground taconite, wash plant tailings, glacial till, overburden and mixtures thereof. In one embodiment, the granular material comprises taconite tailings having particle sizes whereby at least 80% by weight of the taconite tailings particles are smaller than 60 mesh or 250 microns. In another embodiment, the granular material comprises taconite tailings having particle sizes whereby at least 80% by weight of the taconite tailings particles are smaller than 100 mesh or 149 microns. In yet another embodiment, the granular material comprises taconite tailings having particle sizes whereby at least 80% by weight of the taconite tailings particles are smaller than 200 mesh or 74 microns. In still another embodiment, the granular material comprises taconite tailings having particle sizes whereby at least 80% by weight of the taconite tailings particles are smaller than 325 mesh or 44 microns.

In another aspect of the invention, there is provided a process for removing at least a portion of the mercury from a flue gas that includes: (1) providing a scrubbing composition that includes water and a mercury-adsorbing sorbent; (2) atomizing the scrubbing composition; and (3) introducing the atomized scrubbing composition into contact with the flue gas in a manner whereby the sorbent adsorbs at least a portion of the mercury in the flue gas. In one embodiment, the process further includes separating the sorbent from the flue gas. The sorbent can be separated from the flue gas, for example by separating the scrubbing composition from the flue gas and then separating the sorbent from the scrubbing liquid after the scrubbing liquid is separated from the flue gas. After separation, the sorbent can be disposed of. A flue gas that can be treated in this manner includes, for example, a flue gas produced by one of the following processes: a coal fired power plant process, a taconite pellet indurating plant process, a wood product production plant process, an iron mill process or a steel mill process.

In one preferred manner of treating flue gases, the sorbent is derived from taconite tailings. In one embodiment, the granular material comprises taconite tailings having particle sizes whereby at least 80% by weight of the taconite tailings particles are smaller than 60 mesh or 250 microns. In another embodiment, the granular material comprises taconite tailings having particle sizes whereby at least 80% by weight of the taconite tailings particles are smaller than 100 mesh or 149 microns. In yet another embodiment, the granular material comprises taconite tailings having particle sizes whereby at least 80% by weight of the taconite tailings particles are smaller than 200 mesh or 74 microns. In still another embodiment, the granular material comprises taconite tailings having particle sizes whereby at least 80% by weight of the taconite tailings particles are smaller than 325 mesh or 44 microns.

Another aspect of the present invention provides a method for removing at least a portion of the mercury from a flue gas using a baghouse cleaning process, wherein the baghouse system utilizes a filter cloth comprising a fabric and a mercury-adsorbing sorbent affixed thereto. In alternate preferred embodiments, the sorbent can be affixed to the fabric by being imbedded therein, impregnated therein, laminated thereon, sandwiched therein, sprayed thereon, adhered thereto, coated thereon, or otherwise integrated into the filter cloth. A bag composed of said filter cloth is preferably capable of removing particulates from the flue gas, and trapping mercury from the flue gas. In an advantageous manner of practicing the invention, the sorbent is derived from taconite tailings. In one embodiment, the granular material comprises taconite tailings having particle sizes whereby at least 80% by weight of the taconite tailings particles are smaller than 60 mesh or 250 microns. In another embodiment, the granular material comprises taconite tailings having particle sizes whereby at least 80% by weight of the taconite tailings particles are smaller than 100 mesh or 149 microns. In yet another embodiment, the granular material comprises taconite tailings having particle sizes whereby at least 80% by weight of the taconite tailings particles are smaller than 200 mesh or 74 microns. In still another embodiment, the granular material comprises taconite tailings having particle sizes whereby at least 80% by weight of the taconite tailings particles are smaller than 325 mesh or 44 microns. A flue gas that can be treated in this manner includes, for example, a flue gas produced by one of the following processes: a coal fired power plant process, a taconite pellet indurating plant process, a wood product production plant process, an iron production plant process, or a steel mill process. In another aspect of the invention, there is provided a filter cloth for use in a baghouse cleaning process. The filter cloth includes a fabric and a mercury-adsorbing sorbent affixed to the fabric.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A process for removing mercury from treatment fluid, comprising: providing a sorbent comprising a granular material having mercury-adsorbing functionality; mixing a treatment fluid containing mercury with the sorbent in a container or a conduit to provide a mixture in which the sorbent contacts the treatment fluid to adsorb at least a portion of the mercury to the sorbent; and separating at least a portion of the treatment fluid from at least a portion of the mercury-laden sorbent; wherein the treatment fluid comprises water having mercury dissolved therein; wherein the sorbent comprises taconite tailings.

2. The process in accordance with claim 1, further comprising agitating the sorbent in the treatment fluid with a mixer.

3. The process in accordance with claim 1, wherein the treatment fluid is a fluid selected from the group consisting scrubber blow down water from a coal fired power plant, fluid discharge from a taconite pellet indurating plant process, waste water from an iron nugget production facility, waste water from a coal fired power plant, waste water from an iron production plant, waste water from a steel making plant, waste water from an iron reduction process, waste water from an electrical generation process, and waste water from a wood products production process.

4. The process in accordance with claim 1 wherein the granular material comprises taconite tailings having particle sizes whereby at least 80% by weight of the taconite tailings particles are smaller than 60 mesh or 250 microns.

5. The process in accordance with claim 1 wherein the granular material comprises taconite tailings having particle sizes whereby at least 80% by weight of the taconite tailings particles are smaller than 100 mesh or 149 microns.

6. The process in accordance with claim 1 wherein the granular material comprises taconite tailings having particle sizes whereby at least 80% by weight of the taconite tailings particles are smaller than 200 mesh or 74 microns.

7. The process in accordance with claim 1 wherein the granular material comprises taconite tailings having particle sizes whereby at least 80% by weight of the taconite tailings particles are smaller than 325 mesh or 44 microns.

8. The process in accordance with claim 1, further comprising passing at least a portion of the mixture to a filtration system, and wherein said separating occurs in said filtration system.

9. The process in accordance with claim 8 wherein the mercury-laden sorbent from the portion is collected as a moist solid waste in a filter cake that is removed from the treatment fluid in said filtration system.

10. The process in accordance with claim 9, further comprising disposing of the solid waste.

11. The process in accordance with claim 10 wherein said solid waste is disposed of in a land fill, pit, basin, pond or other holding location.

12. The process in accordance with claim 1, further comprising contacting some or all of the treatment fluid with additional sorbent after said separating.

13. The process in accordance with claim 1, where the taconite tailings are positioned as at least one element in a multi-media filter, whereby at least a portion of the mercury in a treatment fluid stream passing through the filter adsorbs to a portion of the taconite tailings, to provide a filter having a dual functionality of removing suspended particles greater than a certain size from the treatment fluid and of binding at least a portion of the mercury in the treatment fluid.

14. The method in accordance with claim 1 wherein: the treatment fluid comprises a waste fluid exiting a coal fired power plant; wherein said providing a sorbent comprises providing a potency enhanced particle size fraction of taconite tailings having an optimized sorptive capacity, the fraction selected from the group consisting of: (1) a size fraction having particle sizes whereby at least 80% by weight of the taconite tailings particles are smaller than 60 mesh or 250 microns; (2) a size fraction having particle sizes whereby at least 80% by weight of the taconite tailings particles are smaller than 100 mesh or 149 microns; (3) a size fraction having particle sizes whereby at least 80% by weight of the taconite tailings particles are smaller than 200 mesh or 74 microns; and (4) a size fraction having particle sizes whereby at least 80% by weight of the taconite tailings particles are smaller than 325 mesh or 44 microns; and wherein said mixing comprises introducing the fraction into a mercury containing waste fluid stream exiting the plant at a rate of from about 0.01 grams per liter of the stream to about 20 grams per liter of the stream, wherein the fraction adsorbs at least a portion of the mercury.

15. The method in accordance with claim 14 wherein the taconite tailings are entrained within the waste fluid for a time sufficient to allow binding of at least a portion of the mercury in the waste fluid to the taconite tailings and removal thereof from the waste fluid by allowing the taconite tailings to be separated from the waste fluid by the separation systems already in place for removing the solids from the waste fluid that is generated by the plant.

16. The method in accordance with claim 14 wherein the rate at which the fraction is introduced is determined as a function of the desired ending concentration of Hg and the Hg concentration of the influent waste water stream.

17. A method for using taconite tailings, comprising:
mixing the taconite tailings with a treatment fluid including mercury to provide a mixture in which the taconite tailings contact the treatment fluid to adsorb at least a portion of the mercury to at least a portion of the taconite tailings; and
separating mercury-laden taconite tailings from the treatment fluid;
wherein the treatment fluid comprises water having mercury dissolved therein.

18. The method in accordance with claim 17 wherein said separating comprises introducing the mixture into a device selected from the group consisting of a clarifier, a lamella, a hydro-separator and a thickener to clarify the treatment fluid, thus producing a clarified fluid.

19. The method in accordance with claim 18, further comprising introducing into the device an additive selected from the group consisting of a coagulating agent and a flocculating agent.

20. The method in accordance with claim 19 wherein the additive is selected from the group consisting of a polymer, ferric chloride, and alum.

21. The method in accordance with claim 17, further comprising, after said separating, cleansing the clarified fluid to remove suspended solids by filtration.

22. The method in accordance with claim 21 wherein said cleansing comprises passing the clarified fluid through one or more multi-media filters that include taconite tailings positioned as at least one element.

23. The method in accordance with claim 21 wherein said cleansing comprises passing the clarified fluid through one or more multi-media filters; and wherein at least one of the one or more multi-media filters includes a medium selected from the group consisting of gravel, sand, fine garnet, coal, anthracite, taconite tailings, and resin.

24. The method in accordance with claim 17, further comprising discharging the treatment fluid after separating the mercury-laden taconite tailings.

25. The method in accordance with claim 17, further comprising filtering the mercury-laden taconite tailings by pressure filtration or vacuum filtration to a solid waste and disposing of the solid waste.

26. The method in accordance with claim 17 wherein the taconite tailings comprise a particle size fraction having an optimized sorptive capacity, the fraction selected from the group consisting of: (1) a size fraction having particle sizes whereby at least 80% by weight of the taconite tailings particles are smaller than 60 mesh or 250 microns; (2) a size fraction having particle sizes whereby at least 80% by weight of the taconite tailings particles are smaller than 100 mesh or 149 microns; (3) a size fraction having particle sizes whereby at least 80% by weight of the taconite tailings particles are smaller than 200 mesh or 74 microns; and (4) a size fraction having particle sizes whereby at least 80% by weight of the taconite tailings particles are smaller than 325 mesh or 44 microns.

27. The method in accordance with claim 26 wherein the granular material comprises a particle size fraction of taconite tailings having an optimized dual functionality of sorptive capacity and capacity for being separated from the treatment fluid, the fraction further having been processed by removing a significant portion of the smallest particles selected from the group consisting of: (1) particles that normally would pass through a 500 mesh screen (32 microns) using conventional wet screening techniques and equipment, (2) particles that pass through a 400 mesh (37 microns) screen cloth using wet screening techniques and equipment, and (3) particles that pass through a 325 mesh (44 microns) screen cloth using wet screening techniques and equipment.

28. The method in accordance with claim 27 where the treatment fluid is selected from the group consisting of a waste fluid from a coal fired power plant, a waste fluid from an iron production plant, a waste fluid from a steel making plant, a waste fluid from an taconite pellet production plant, and a waste fluid from a wood products production plant.

29. The method in accordance with claim 27, wherein said separating comprises introducing the mixture onto a wet vibrating screen to pass the treatment fluid therethrough and retain the taconite tailings thereon.

30. The method in accordance with claim 29, further comprising, after said separating, returning all or part of the taconite tailings to said mixing step to be reused for adsorbing mercury from a treatment fluid.

31. The method in accordance with claim 30 wherein said returning is repeated until the capacity of the taconite tailings to bind mercury has been diminished to an unacceptable level.

32. A method for treating waste water from an industrial production process, comprising:
receiving waste water from a plant water discharge, the waste water having mercury dissolved therein;
mixing the waste water with taconite tailings in a mixing tank to adhere mercury in the waste water to the taconite tailings; and
separating the mercury-laden taconite tailings from the waste water.

33. The method in accordance with claim 32 wherein the industrial production process is selected from the group consisting of an iron production process and a coal fired power plant process.

34. The method in accordance with claim 32 wherein the waste water comprises waste water from blow down from a wet wall precipitator.

35. The method in accordance with claim 32 wherein the waste water comprises waste water from blow down from a wet scrubber.

36. The method in accordance with claim 35 wherein the wet scrubber scrubs flue gases from thermal consumption of coal.

37. The method in accordance with claim 32 wherein at least a portion of the waste water is discharged for outflow after separating the mercury-laden taconite tailings.

38. The method in accordance with claim 32 wherein at least a portion of the waste water is returned to the mixing tank for mixing with mercury-laden waste water and taconite tailings.

39. The method in accordance with claim 32 wherein at least a portion of the taconite tailings are returned to the mixing tank for mixing with mercury-laden waste water and fresh taconite tailings.

* * * * *